United States Patent
Cheng et al.

(10) Patent No.: US 11,758,595 B2
(45) Date of Patent: Sep. 12, 2023

(54) WIRELESS IN-VEHICLE NETWORKING ARCHITECTURE

(71) Applicant: QUALCOMM Incorporated, San Diego, CA (US)

(72) Inventors: Hong Cheng, Basking Ridge, NJ (US); Dan Vassilovski, Del Mar, CA (US); Shailesh Patil, San Diego, CA (US); Sudhir Kumar Baghel, Hillsborough, NJ (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 200 days.

(21) Appl. No.: 17/102,562

(22) Filed: Nov. 24, 2020

(65) Prior Publication Data
US 2021/0195669 A1    Jun. 24, 2021

Related U.S. Application Data

(60) Provisional application No. 62/952,554, filed on Dec. 23, 2019.

(51) Int. Cl.
*B60K 37/06* (2006.01)
*H04L 12/28* (2006.01)
(Continued)

(52) U.S. Cl.
CPC ........... *H04W 76/14* (2018.02); *H04L 5/0055* (2013.01); *H04W 8/005* (2013.01); *H04W 72/20* (2023.01)

(58) Field of Classification Search
CPC ... H04L 1/1893; H04L 5/0044; H04L 5/0055; H04L 1/1812; H04L 1/0026;
(Continued)

(56) References Cited

U.S. PATENT DOCUMENTS

2008/0049718 A1* 2/2008 Chindapol ......... H04B 7/15592
370/351
2009/0190536 A1* 7/2009 Zhang .................. H04W 72/08
370/329
(Continued)

OTHER PUBLICATIONS

LG Electronics Inc: "Medium Access for D2D Communication", 3GPP TSG-RAN WG2 #84, 3GPP Draft R2-134426 [D2D-C] Medium Access for D2D Communication, 3RD Generation Partnership Project (3GPP), Mobile Competence Centre; 650, Route Des Lucioles; F-06921 Sophia-Antipolis Cedex; France, vol. RAN WG2, No. Sanfransisco, USA; Nov. 11, 2013-Nov. 15, 2013, Nov. 13, 2013, pp. 1-9, XP050737132, URL: http://www.3gpp.org/ftp/Meetings_3GPP_SYNC/RAN/RAN2/Docs/.
(Continued)

*Primary Examiner* — Edan Orgad
*Assistant Examiner* — Vanneilian Lalchinthang
(74) *Attorney, Agent, or Firm* — Patterson + Sheridan, LLP

(57) ABSTRACT

Certain aspects of the present disclosure provide techniques for wireless in-vehicle networking. A method that may be performed by a device in a vehicle includes wirelessly transmitting a data packet directly via a first device-to-device (D2D) communication link to another device in the vehicle; monitoring for an acknowledgment (ACK) of the data packet; deciding whether to retransmit the data packet to the other device, based on the monitoring; and wirelessly transmitting the data packet to a transmission relay, wherein an intended destination of the data packet is the other device, wherein the monitoring for the ACK comprises monitoring for a first ACK from the other device and a second ACK from the transmission relay.

30 Claims, 14 Drawing Sheets

(51) Int. Cl.
*H04L 5/00* (2006.01)
*G05D 1/00* (2006.01)
*H04W 76/14* (2018.01)
*H04W 8/00* (2009.01)
*H04W 72/20* (2023.01)

(58) Field of Classification Search
CPC .......... H04L 2001/0097; H04L 5/0048; H04L 5/0007; B60K 37/06; H04N 21/42206; H04W 72/0406; H04W 72/20; H04W 8/005; H04W 16/14; H04W 72/23; H04W 76/14; H04W 88/04; H04B 7/15592; G05D 1/0061; B60W 30/182
USPC ........................................................ 370/329
See application file for complete search history.

(56) References Cited

U.S. PATENT DOCUMENTS

| | | | | |
|---|---|---|---|---|
| 2010/0304349 | A1* | 12/2010 | Kunin | G09B 7/02 434/323 |
| 2012/0020279 | A1* | 1/2012 | Kim | H04B 7/15592 370/315 |
| 2012/0320763 | A1* | 12/2012 | Hong | H04W 24/10 370/246 |
| 2013/0182582 | A1* | 7/2013 | Bontu | H04B 7/15557 370/246 |
| 2015/0119023 | A1* | 4/2015 | Wang | H04W 12/041 455/432.1 |
| 2015/0319796 | A1* | 11/2015 | Lu | H04B 7/2656 370/330 |
| 2017/0034834 | A1* | 2/2017 | Folke | H04W 76/14 |
| 2018/0049220 | A1* | 2/2018 | Patil | H04W 72/1247 |
| 2018/0196427 | A1* | 7/2018 | Majumdar | B60W 40/09 |
| 2019/0337389 | A1* | 11/2019 | Barvesten | G05G 5/06 |
| 2020/0311716 | A1* | 10/2020 | Ravi | G06Q 20/325 |

OTHER PUBLICATIONS

Orange., et al., "Network Control for Public Safety D2D Communications", 3GPP TSG-RAN WG2 Meeting #84, 3GPP Draft; R2-133990 Network Control for Public Safety D2D Communications, 3rd Generation Partnership Project (3GPP), Mobile Competence Centre; 650, Route Des Lucioles; F-06921 Sophia-Antipolis Ced vol. RAN WG2, No. San Francisco, US; Nov. 11, 2013-Nov. 15, 2013,Nov. 13, 2013, 5 Pages, XP050736798, URL: http://www.3gpp.org/ftp/Meetings_3GPP_SYNC/RAN/RAN2/Docs/.
Partial International Search Report—PCT/US2020/062165—ISA/EPO—dated Mar. 10, 2021.

* cited by examiner

WIRELESS IN-VEHICLE NETWORKING ARCHITECTURE

CROSS-REFERENCE TO RELATED APPLICATIONS

This application claims benefit of and priority to U.S. Provisional Patent Application No. 62/952,554, filed Dec. 23, 2019, which is assigned to the assignee hereof and herein incorporated by reference in its entirety as if fully set forth below and for all applicable purposes.

BACKGROUND

Field of the Disclosure

Aspects of the present disclosure relate to wireless communications, and more particularly, to techniques for wirelessly networking devices in vehicles and improving communications reliability for wireless in-vehicle networks.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include reduced component costs, reduced weight, improved design flexibility, improved manufacturing flexibility, redundancy for critical networks, and higher communications reliability for in-vehicle networks.

Certain aspects provide a method for wireless communication performed by a device in a vehicle. The method generally includes wirelessly transmitting a data packet directly via a first device-to-device (D2D) communication link to another device in the vehicle; wirelessly transmitting the data packet to a transmission relay, wherein the intended destination of the data packet is the other device; monitoring for an acknowledgment (ACK) of the data packet from at least one of the other device or the transmission relay; and deciding whether to retransmit the data packet to at least one of the other device or the transmission relay.

Certain aspects provide a method for wireless communication performed by a central controller in a vehicle. The method generally includes receiving, from a device in the vehicle, a request to transmit from the device to another device in the vehicle; and wirelessly transmitting, in response to the request, one or more allocations of transmission resources to the device, wherein the transmission resources comprise first transmission resources for a first transmission from the device directly to another device and second transmission resources for a second transmission to a first transmission relay.

Certain aspects provide a method for wireless communication performed by a device in a vehicle. The method generally includes receiving one or more allocations of transmission resources from a central controller in the vehicle; wirelessly receiving a data packet from another device other than the central controller via the transmission resources; and wirelessly receiving the data packet from a first transmission relay via the transmission resources.

Certain aspects provide a method for wireless communication performed by a transmission relay in a vehicle. The method generally includes receiving one or more allocations of transmission resources from a central controller in the vehicle; wirelessly receiving a data packet from a first device via a first device-to-device (D2D) communication link on the transmission resources; and wirelessly transmitting the data packet to a second device via a second D2D communication link on the transmission resources.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
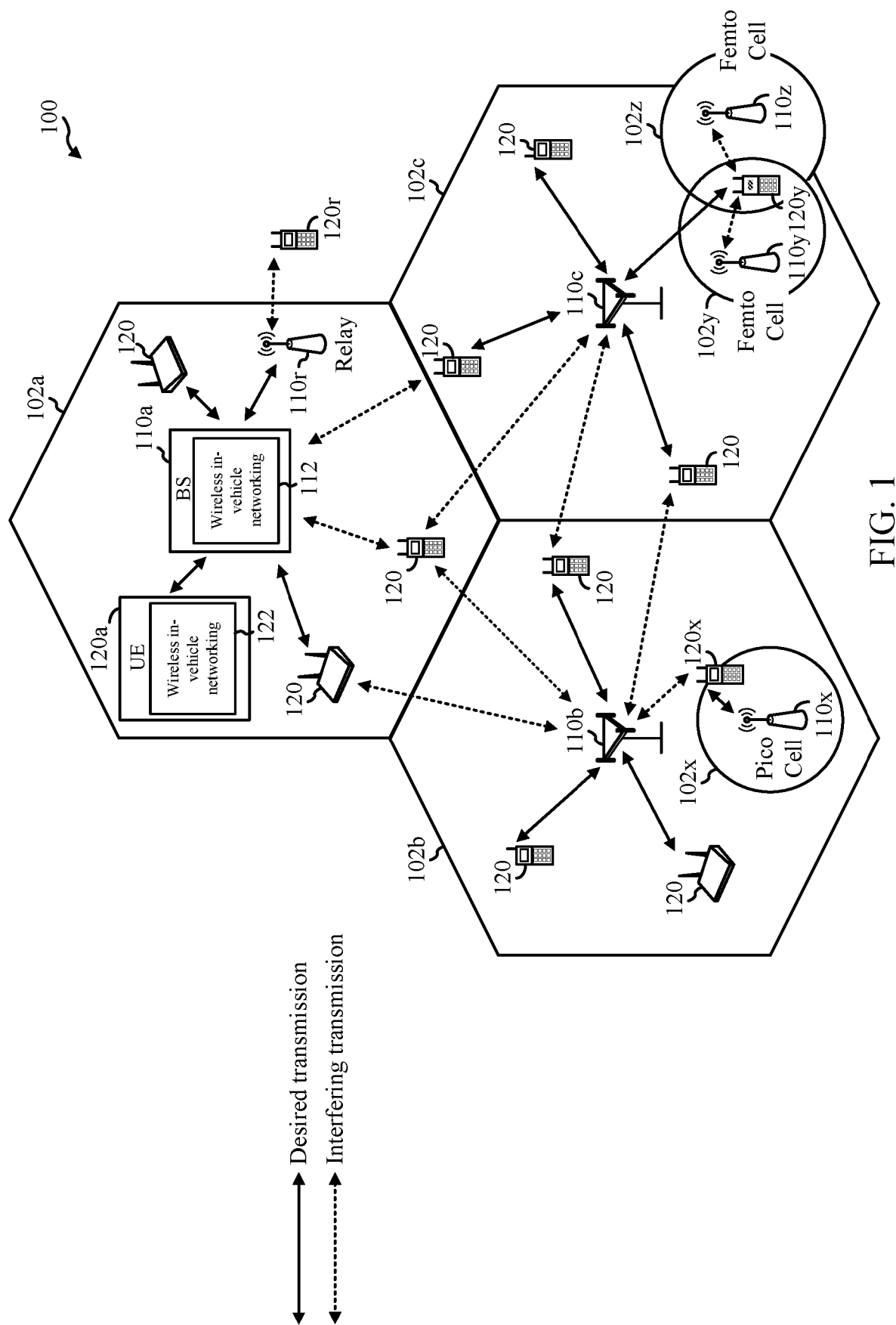
FIG. 1 is a block diagram conceptually illustrating an example telecommunications system, in accordance with certain aspects of the present disclosure.

Aspects of the present disclosure provide apparatus, methods, processing systems, and computer readable mediums for wirelessly networking devices in vehicles and improving communications reliability for wireless in-vehicle networks. According to previously known techniques, vehicles use wired in-vehicle networks (IVN). With the development of autonomous driving, more devices and sensors are connected in vehicles currently being produced or developed. The increased numbers of devices and sensors leads to significant increases in numbers of connections in a vehicle, which leads to complications in wiring in the vehicles. The increase in number of connections and complicated wiring pose significant problems for vehicle manufacturers, due to the weight, cost, design complexity, installation complexity, and maintenance complexity caused by the increased numbers of devices and sensors. It is therefore desirable to develop wireless IVN. However, to support IVN applications, it is desirable that wireless connections support extremely high reliability (e.g., $10^{-7}$ or better reliability) with retransmissions in the network. It is also desirable that wireless IVN support relatively low latency (e.g., 10-30 ms latency) to meet service criteria of the IVN applications. It is desirable that wireless IVN meet these reliability and latency criteria in the presence of interference between the devices and interference from other vehicles or radio sources in proximity to a vehicle.

According to aspects of the present disclosure, techniques for employing a centrally controlled direct communication model with additional relays in a wireless in-vehicle network (wIVN) to achieve high reliability are provided.

In aspects of the present disclosure, a central controller manages resource allocation, timing, synchronization, and interference mitigation from other vehicles based on device reporting in a wireless in-vehicle network.

According to aspects of the present disclosure, usage of a transmission relay may provide higher reliability support in a managed manner in a wireless in-vehicle network.

The following description provides examples of wireless in-vehicle networks, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for wireless in-vehicle networking. For example, BS 110a may be installed in a vehicle as a central controller of a wireless in-vehicle network, and UE 120a may be a device (e.g., a sensor, a camera, an engine controller, or a display) installed in the vehicle and wirelessly networked to the central controller and other devices in the vehicle. As shown in FIG. 1, the BS 110a includes a wireless in-vehicle networking manager 112. The wireless in-vehicle networking manager 112 may be configured to receive, from a device in the vehicle, a request to transmit from the device to another device in the vehicle; and to wirelessly transmit, in response to the request, one or more allocations of transmission resources to the device, wherein the transmission resources comprise first transmission resources for a first transmission from the device directly to another device and second transmission resources for a second transmission to a first transmission relay, in accordance with aspects of the present disclosure. In some examples, the wireless in-vehicle networking manager 112 may receive one or more allocations of transmission resources from a central controller in the vehicle; wirelessly receive a data packet from a first device other than the central controller via the transmission resources; and wirelessly transmit the data packet to a second device via the transmission resources. As shown in FIG. 1, the UE 120a includes a wireless in-vehicle networking manager 122. The wireless in-vehicle networking manager 122 may be configured to wirelessly transmit a data packet directly to another device in the vehicle; to wirelessly transmit the data packet to a transmission relay, wherein the intended destination of the data packet is the other device; to monitor for an acknowledgment (ACK) of the data packet from at least one of the other device or the transmission relay; and to decide whether to retransmit the data packet to at least one of the other device or the transmission relay, in accordance with aspects of the present disclosure. In some examples, the wireless in-vehicle networking manager 122 may receive one or more allocations of transmission resources from a central controller in the vehicle; wirelessly receive a data packet from another device other than the central controller via the transmission resources; and wirelessly receive the data packet from a first transmission relay via the transmission resources.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices. The relays may be configured to receive one or more allocations of transmission resources from a central controller in the vehicle; to wirelessly receive a data packet from a first device other than the central controller via the transmission resources; and to wirelessly transmit the data packet to a second device via the transmission resources.

Figure 2:
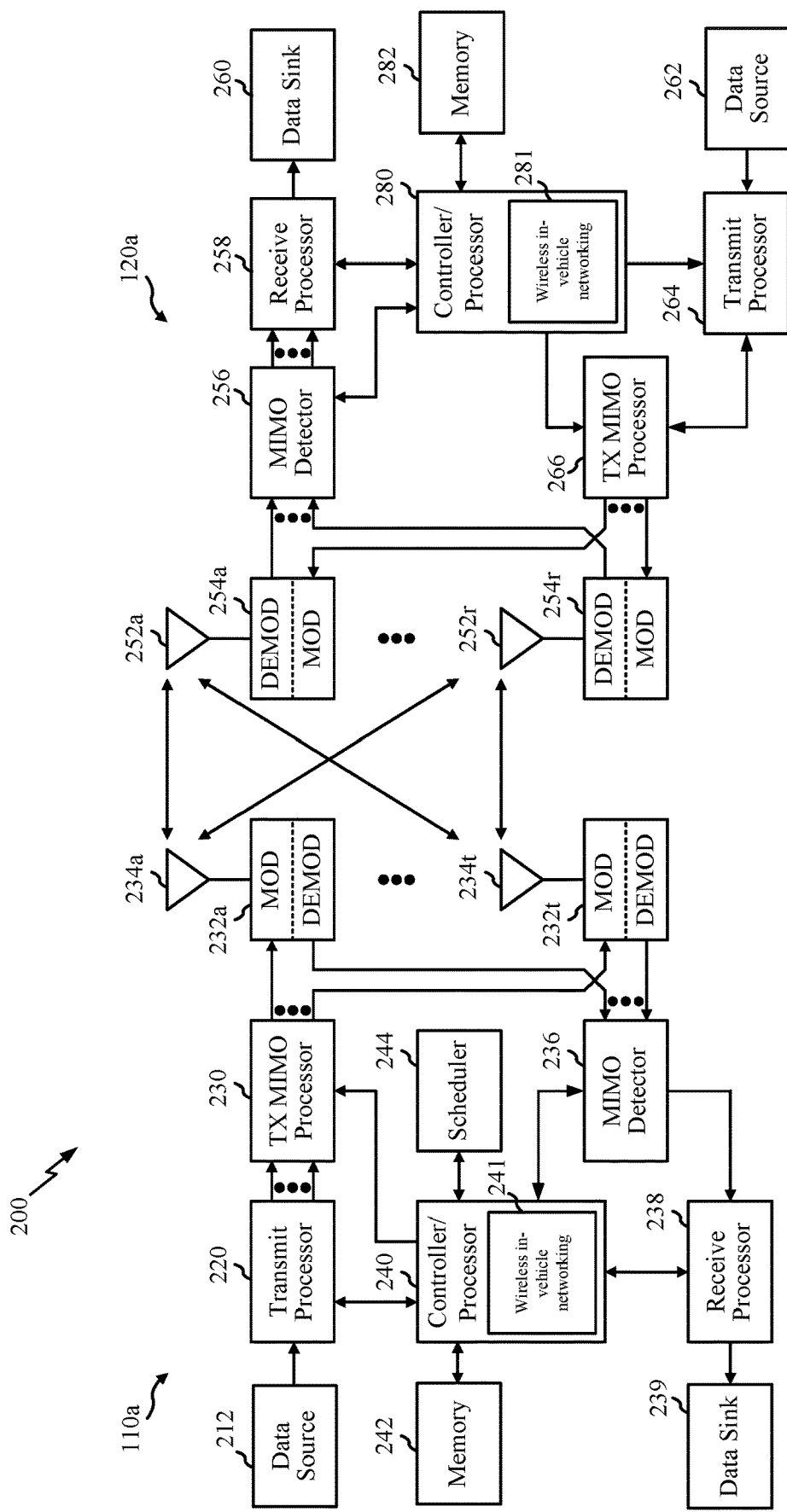
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254*a*-254*r* (e.g., for SC-FDM, etc.), and transmitted to the BS 110*a*. At the BS 110*a*, the uplink signals from the UE 120*a* may be received by the antennas 234, processed by the modulators 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

The controller/processor 280 and/or other processors and modules at the UE 120*a* may perform or direct the execution of processes for the techniques described herein. For example, as shown in FIG. 2, the controller/processor 240 of the BS 110*a* has a wireless in-vehicle networking manager 241 that may be configured for receiving, from a device in the vehicle, a request to transmit from the device to another device in the vehicle; and for wirelessly transmitting, in response to the request, one or more allocations of transmission resources to the device, wherein the transmission resources comprise first transmission resources for a first transmission from the device directly to another device and second transmission resources for a second transmission to a first transmission relay, according to aspects described herein. As shown in FIG. 2, the controller/processor 280 of the UE 120*a* has a wireless in-vehicle networking manager 281 that may be configured for wirelessly transmitting a data packet directly to another device in the vehicle; for wirelessly transmitting the data packet to a transmission relay, wherein the intended destination of the data packet is the other device; for monitoring for an acknowledgment (ACK) of the data packet from at least one of the other device or the transmission relay; and for deciding whether to retransmit the data packet to at least one of the other device or the transmission relay, according to aspects described herein. Although shown at the Controller/Processor, other components of the UE 120*a* and BS 110*a* may be used performing the operations described herein.

Figure 3:
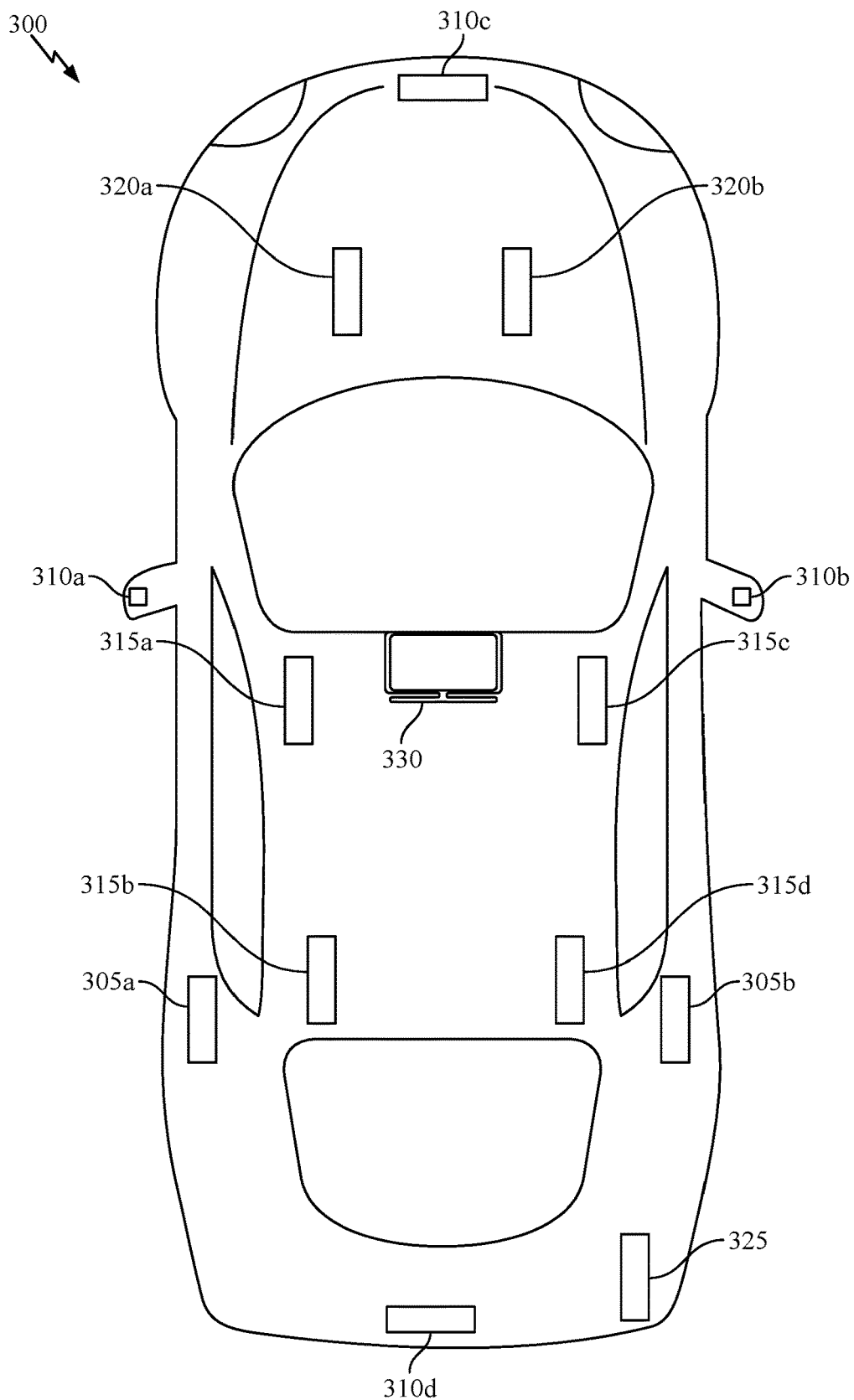
FIG. 3 shows an exemplary vehicle, according to previously known techniques.

FIG. 3 shows an exemplary vehicle 300, according to previously known techniques. The exemplary vehicle includes door sensors 305*a*-*b*, cameras 310*a*-*d*, in-cabin sensors 315*a*-*d*, engine sensors 320*a*-*b*, an exhaust sensor 325, and a display 330, which may be collectively referred to as devices. According to previously known techniques, the various devices may communicate with each other via a wired in-vehicle network via a bus that may be an implementation of a controller area network (CAN) bus, an Ethernet bus, or some other type of bus.

As discussed above, increasing numbers of devices and sensors in vehicles being developed leads to significant increases in numbers of connections in a vehicle, which leads to complications in wiring in the vehicles. The increase in number of connections and complicated wiring pose significant problems for vehicle manufacturers, due to the weight, cost, design complexity, installation complexity, and maintenance complexity caused by the increased numbers of devices and sensors.

Accordingly, it is desirable to develop techniques and apparatus for wireless IVN.

Example Wireless In-Vehicle Networking Architecture

Aspects of the present disclosure provide apparatus, methods, processing systems, and computer readable mediums for wirelessly networking devices in vehicles and improving communications reliability for wireless in-vehicle networks.

Figure 4:
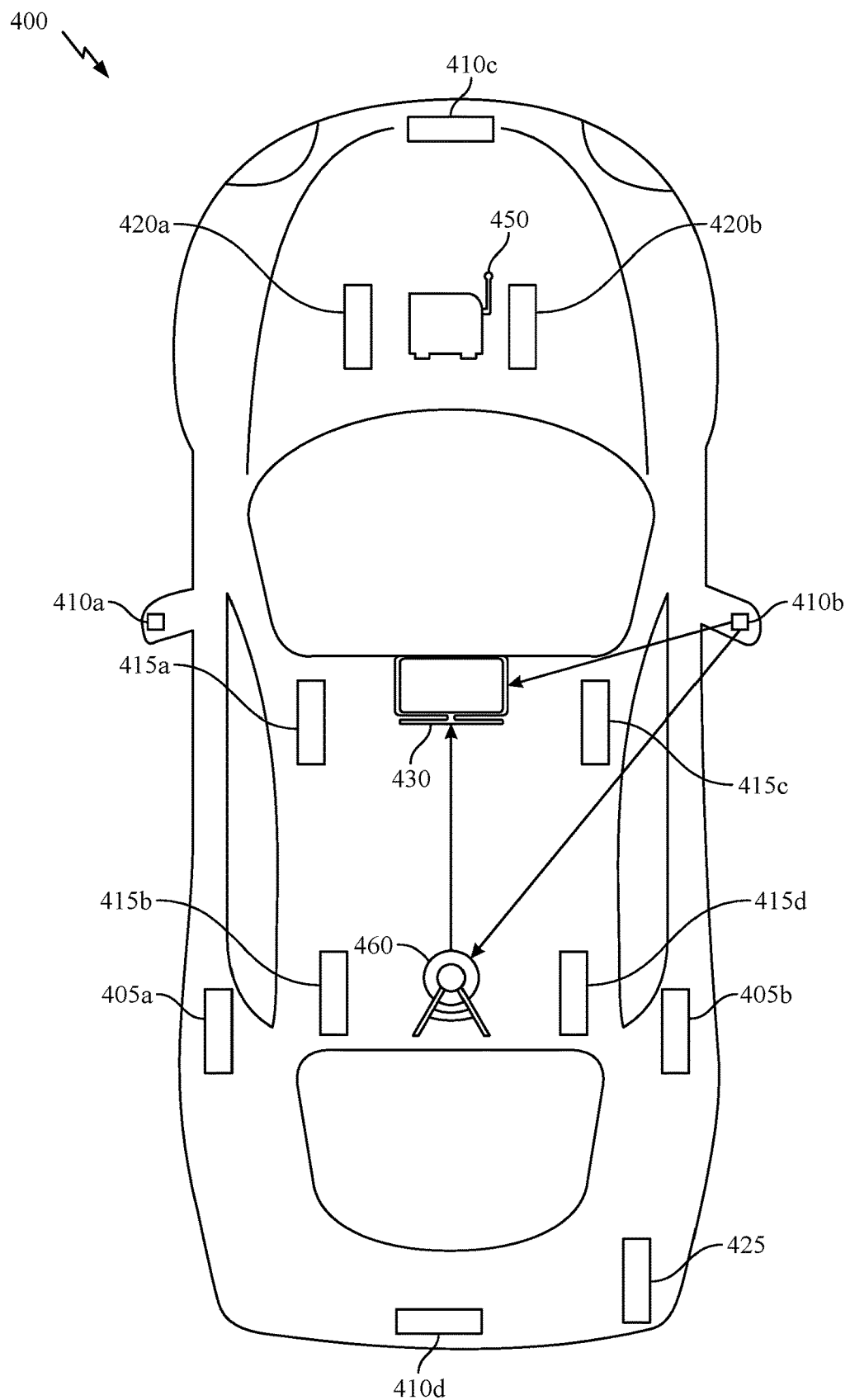
FIG. 4 shows an exemplary vehicle, according to aspects of the present disclosure.

FIG. 4 shows an exemplary vehicle 400, according to aspects of the present disclosure. The exemplary vehicle is similar to the exemplary vehicle 300 includes door sensors 405*a*-*b*, cameras 410*a*-*d*, in-cabin sensors 415*a*-*d*, engine sensors 420*a*-*b*, an exhaust sensor 425, and a display 430, which may be collectively referred to as devices. According to aspects of the present disclosure, the exemplary vehicle also has a wireless network controller 450 and a wireless relay 460. In the exemplary vehicle 400, the various devices may with each other via a wireless in-vehicle network controlled by the wireless in-vehicle network controller 450 (wIVN controller). As illustrated, a device such as camera 410*b* may send a data packet directly to another device, such as display 430, without the data packet going through the wIVN controller 450. Also as illustrated a device such as camera 410*b* may send the data packet to another device, such as display 430, via the relay 460.

According to aspects of the present disclosure, a wireless in-vehicle network may operate according to 5G NR standards.

In aspects of the present disclosure, the controller 430 may serve as a relay in addition to acting as a network controller, if needed. That is, a device, such as camera 410*c*, may send a data packet to another device, such as display 430, via the wIVN controller 450. The wIVN controller receives the data packet, which includes an indication of an address of the destination device, and the controller forwards the data packet to the destination device. The wIVN controller 450 may determine the radio resources for the Relay 460, or itself, for the forwarding of the packet from the source device 410*c*, as part of the resource allocation procedure. If the radio resources for the source device 410's transmission and the forwarding is allocated and made known to the Relay 460 or the wIVN controller 450, they may receive the transmission from source device 410*c* according to the resources allocation and forward the packet according to the forwarding resources allocation.

According to aspects of the present disclosure, a vehicle may have more than one relay, depending on the vehicle's design. The wIVN controller may also instruct different wireless in vehicle devices to act as Relays in the process of registration and authorization.

In aspects of the present disclosure, a wIVN controller may manage resource (e.g., time resources, frequency resources, and code resources) allocations for the various wIVN devices in a vehicle.

According to aspects of the present disclosure, wIVN devices may register with a wIVN controller using pre-configured security certificates in a manner similar to a vehicle-to-anything (V2X) unicast security model).

In aspects of the present disclosure, a wIVN controller may provide timing synchronization to all wIVN devices.

According to aspects of the present disclosure, transmissions between different wIVN devices are controlled by a wIVN controller. That is, a device, such as camera 410a, may transmit to another device, such as display 430, using transmission resources granted for the transmission by the wIVN controller.

In aspects of the present disclosure, a wIVN controller may be considered a special wIVN device that may, for example, have a special pre-determined address. Alternatively or additionally, a wIVN controller may have an address that is learned by other wIVN devices when the other wIVN devices register with the wIVN controller. In some aspects of the present disclosure, a wIVN controller may broadcast (e.g., via a device-to-device (D2D) link) an announcement advertising the address of the wIVN controller, and other wIVN devices may obtain the address of the wIVN controller from the announcement.

Alternatively, a wIVN controller can act as a base station. That is, wIVN devices may use a Uu interface for UL and DL communications with the wIVN controller. The wIVN controller may then transmit resource allocations via the Uu interface to a transmitting device and a destination (i.e., receiving) device. In this case, the security association establishment may make use of non-access stratum (NAS) protocol (i.e., the wIVN controller has a mini 5G controller). In addition, when the wIVN controller acts as the base station, it may allocate the radio resources for direct wIVN devices communications over the Uu interface. The wIVN devices uses the allocated radio resources to perform communication directly over the device-to-device communication link.

According to aspects of the present disclosure, an address of a wIVN device in the wireless in-vehicle network may be mapped from wired IVN bus addresses. For example for devices on a controller area network (CAN) bus in a vehicle, the addresses of the devices may be mapped by the wIVN controller at registration time. The wIVN controller may, for example, allocate a prefix for devices on the CAN Bus.

In aspects of the present disclosure, different IVN buses (e.g., a CAN bus, a media oriented systems transport (MOST) bus, or an Ethernet bus) may be designated by the wIVN controller to different wireless channels (e.g., different frequency bands or different carrier frequencies within a frequency band).

According to aspects of the present disclosure, different buses of the same type (e.g., power train CAN or chassis CAN) may be designated by the wIVN controller to different wireless channels.

Figure 5A:
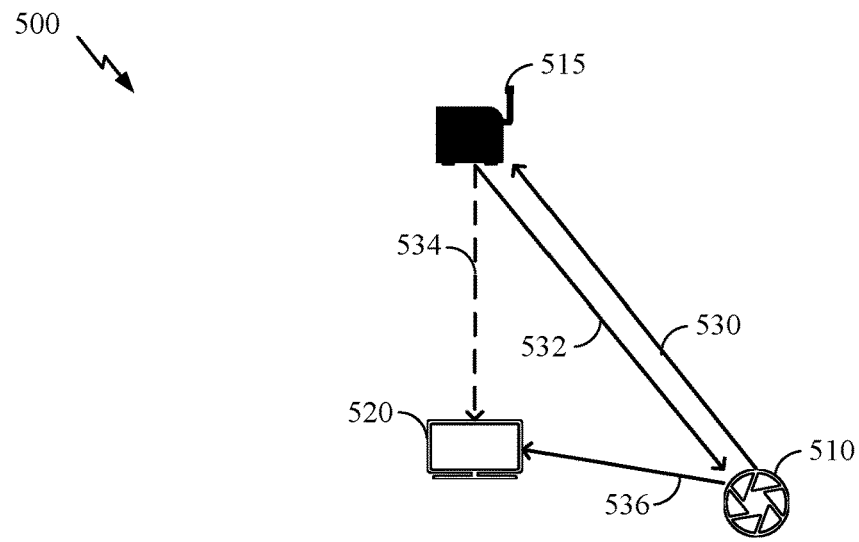
FIG. 5A is a schematic diagram of an exemplary wIVN illustrating a transmission procedure, according to aspects of the present disclosure.

FIG. 5A is a schematic diagram of an exemplary wIVN 500 illustrating a procedure for requesting a resources for transmission in wIVN networks, according to aspects of the present disclosure. In the exemplary wIVN 500, a device (e.g., a camera) 510 determines to transmit data to another device (e.g., a display) 520. The device 510 sends a transmit request 530 to a wIVN controller 515. The transmit request may include an identifier of the device 510 and an identifier of the device 520. The wIVN controller sends a transmit grant 532 to the device 510. The transmit grant may include indications of transmission resources (e.g., time resources, frequency resources, or code resources).

The wIVN controller may optionally send a receive grant 534 to the device 520. The receive grant can be for multiple devices, and may serve as a wake up signal for receiving devices (e.g., when a receiving device may power off in order to save power). The receive grant may indicate an identifier of the device 510 and the transmission resources on which the device 520 should receive the transmission from device 510. The device 510 then transmits the data 536 to the device 520 via the transmission resources granted by the wIVN controller in the transmit grant 530.

According to aspects of the present disclosure, a wIVN may use an enhanced Uu link for an NR sidelink Mode 1 operation for communications between devices.

In aspects of the present disclosure, a wIVN may use an enhanced PC5 sidelink design for communications between devices and allocating resources and managing interference.

Figure 5B:
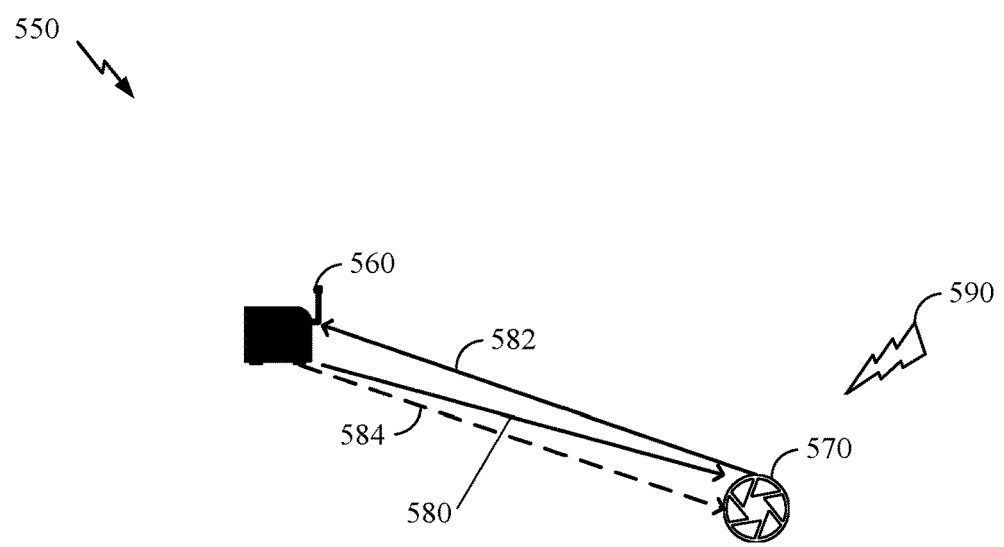
FIG. 5B is a schematic diagram of an exemplary wIVN illustrating an interference management procedure, according to aspects of the present disclosure.

FIG. 5B is a schematic diagram of an exemplary wIVN 550 illustrating a procedure for a wIVN controller to configure reporting for interference management, according to aspects of the present disclosure. In the exemplary wIVN 550, a wIVN controller 560 may configure a device 570 for interference management (e.g., by setting interference measurement thresholds and channels on which to measure interference) by sending an interference measurement configuration message 580 to the device. The device measures interference 590 and transmits a measurement report 582 to the wIVN controller, e.g. when the threshold is crossed. The wIVN controller may then adjust the operational configuration of the controller 560 and/or other devices, including device 570, based on the measured interference. For example, the wIVN controller may send an interference measurement reconfiguration message 584 to the device. The wIVN controller may also optionally obtain interference assistance from a wide-area network (e.g., a public land mobile network (PLMN)) or from other vehicles using, e.g., inter-controller coordination. The wIVN controllers of different vehicles may be able to communicate with each other via Sidelink, which is already available for V2X communications.

According to aspects of the present disclosure, ultra-high reliability in wIVN may be accomplished with relays. Reliability superior to previously known wireless networking techniques may be achieved by utilizing wIVN with relay devices to act as redundant paths for messages.

In aspects of the present disclosure, wIVN devices can be configured by the controller to transmit data as groupcast messages to both the intended receiver and to one or more relays in the vehicle.

Alternatively, wIVN devices can be configured by the controller to transmit data as individual messages to each of the intended receiver and one or more relays in the vehicle.

According to aspects of the present disclosure, a controller can indicate in a receive grant (i.e., a grant indicating a recipient should receive a transmission) to a relay an intended destination for the packet the relay receives in response to the receive grant (i.e., the device that the transmitting device intends to receive the packet).

In aspects of the present disclosure, more than one relay may be deployed in a vehicle, depending on the vehicle and the network architecture. In some aspects, all wIVN devices may have the capability to act as a Relay, and upon registration with the wIVN controller, they may be instructed to operate as Relays for some transmissions or some group of UEs.

According to aspects of the present disclosure, the improved reliability enabled by use of a relay may be shown by comparing a hypothetical error probability (P(error)) of $10^{-3}$ for a wireless transmission network which uses no relays with the hypothetical error probability of a wIVN using a single relay and the same $10^{-3}$ error probability on each transmission. The hypothetical error probability of a wIVN using a single relay may be calculated as shown below:

$$P(\text{error}) = P(\text{error in original transmission}) \times P(\text{error in relay transmission})$$

$$P(\text{error}) = 10^{-3} \times [1-(1-10^{-3})^2]$$

$$P(\text{error}) = 10^{-3} \times [1-(1-2\times 10^{-3}+10^{-6})]$$

$$P(\text{error}) = 10^{-3} \times [2\times 10^{-3}-10^{-6}]$$

$$P(\text{error}) = 2\times 10^{-6}-10^{-9}$$

Figure 6:
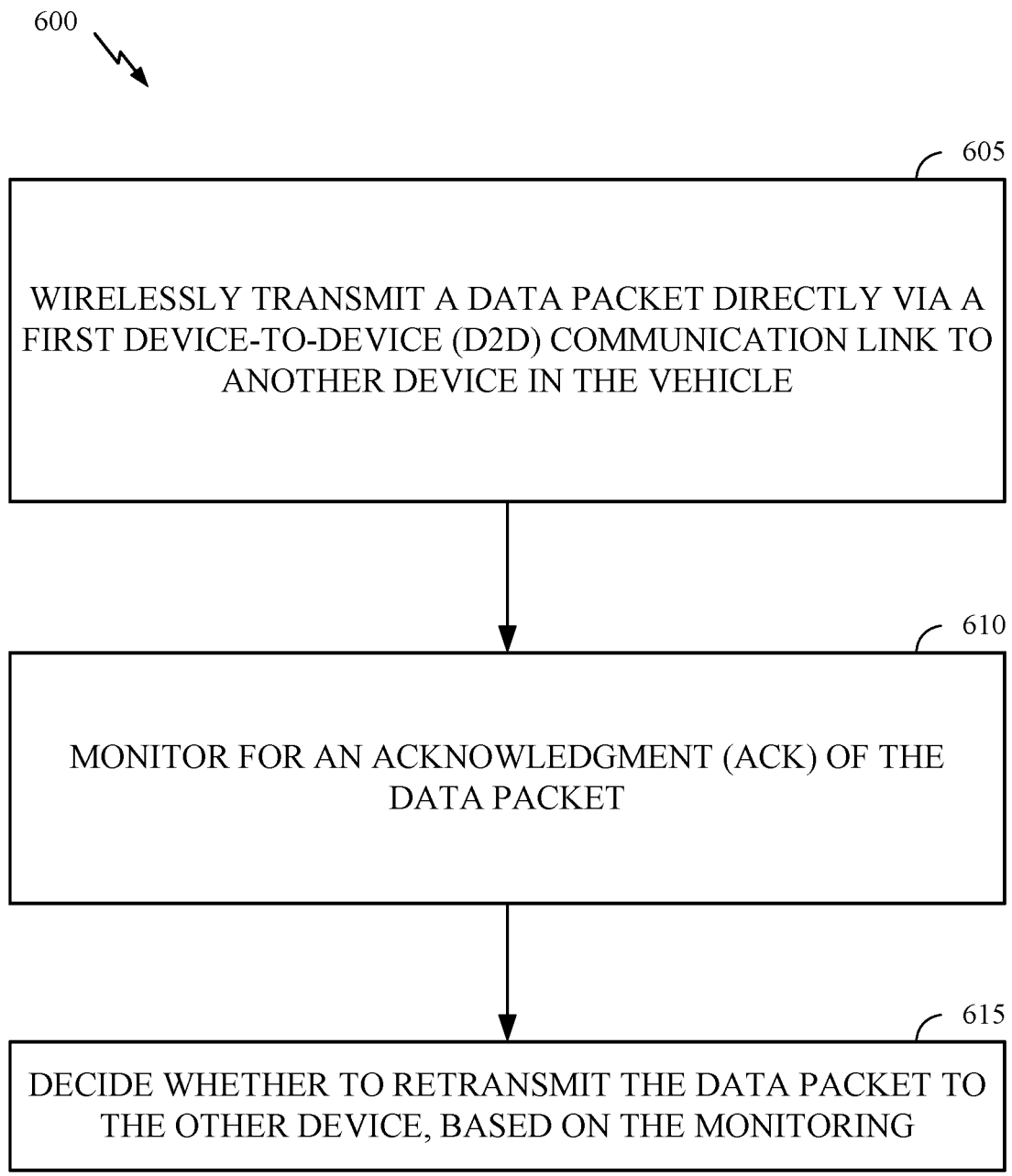
FIG. 6 is a flow diagram illustrating example operations for wireless communication by a transmitting device in a vehicle, in accordance with certain aspects of the present disclosure.

FIG. 6 is a flow diagram illustrating example operations 600 for wireless communication, in accordance with certain aspects of the present disclosure. The operations 600 may be performed, for example, by a device in a vehicle (e.g., such as the UE 120a in the wireless communication network 100 or the device 410b in the vehicle 400). Operations 600 may be implemented as software components that are executed and run on one or more processors (e.g., controller/processor 280 of FIG. 2). Further, the transmission and reception of signals by the device in operations 600 may be enabled, for example, by one or more antennas (e.g., antennas 252 of FIG. 2). In certain aspects, the transmission and/or reception of signals by the device may be implemented via a bus interface of one or more processors (e.g., controller/processor 280) obtaining and/or outputting signals.

The operations 600 may begin, at block 605, by the device wirelessly transmitting a data packet directly via a first device-to-device (D2D) communication link to another device in the vehicle. For example and with reference to FIG. 4, the device may be one of the door sensors 405a-b, cameras 410a-d, in-cabin sensors 415a-d, engine sensors 420a-b, and the exhaust sensor 425 transmitting a data packet directly via a D2D communication link to the display 430, without going through the wIVN controller 450. As an example, the camera 410a may rely on a sidelink channel, which is an example of a D2D communication link, to send a data packet conveying captured image data to the display 430.

Operations 600 continue at block 610 with the device monitoring for an acknowledgment (ACK) of the data packet. Continuing the example from above, the camera 410a monitors for an ACK of the data packet sent to the display 430.

At block 615, operations 600 continue with the device deciding whether to retransmit the data packet to the other device, based on the monitoring. Continuing the example from above, if the camera 410a fails to receive an ACK while monitoring in block 610, the camera 410a may decide to retransmit the data packet to the display 430. If the camera 410a does receive an ACK while monitoring in block 610, then the camera 410a may decide not to retransmit the data packet to the display 430.

In aspects of the present disclosure, a device performing operations 600 may wirelessly transmit the data packet to a transmission relay, wherein the intended destination of the data packet is the other device and wherein the monitoring for the ACK comprises monitoring for a first ACK from the other device and a second ACK from the transmission relay. According to aspects of the present disclosure, the device performing operations 600 (such as one of the door sensors 405a-b, cameras 410a-d, in-cabin sensors 415a-d, engine sensors 420a-b, the exhaust sensor 425, and the display 430) may receive an allocation of first transmission resources from a central controller in the vehicle, wherein wirelessly transmitting the data packet directly to the other device comprises transmitting the data packet via the first transmission resources; and receive an allocation of second transmission resources from the central controller, wherein wirelessly transmitting the data packet to the transmission relay comprises transmitting the data packet via the second transmission resources. The device may also transmit a request for the allocation of first transmission resources and the allocation of second transmission resources to the central controller. The device may also register with the central controller prior to receiving the allocation of the first transmission resources. In aspects of the present disclosure, receiving the allocation of the first transmission resources may include receiving the allocation of the first transmission resources via a second D2D communication link (e.g., an enhanced PC5 sidelink or a Uu sidelink) and receiving the allocation of the second transmission resources may include receiving the allocation of the second transmission resources via the second D2D communication link or a third D2D communication link. According to aspects of the present disclosure, the device may discover an address of the central controller based on a broadcast via a device-to-device (D2D) communication link (e.g., one of the first, the second, the third, or a fourth D2D communication links). In aspects of the present disclosure, wirelessly transmitting the data packet to the transmission relay may include wirelessly transmitting the data packet to the central controller. That is, the central controller may act as the relay.

In aspects of the present disclosure, a device performing operations 600 may receive an allocation of first transmission resources from a central controller in the vehicle, wherein wirelessly transmitting the data packet directly to the other device as in block 605 may include transmitting the data packet via the first transmission resources. The device may discover an address of the central controller based on a broadcast via a device-to-device (D2D) communication link (e.g., the first or a second D2D communication link). According to some aspects of the present disclosure, receiving the allocation of the first transmission resources may include receiving the allocation of the first transmission resources via the first or a second D2D communication link (e.g., an enhanced PC5 sidelink or a Uu sidelink).

According to aspects of the present disclosure, the device performing operations 600 may wirelessly transmit the data packet to a second transmission relay, wherein the intended destination of the data packet is the other device.

In aspects of the present disclosure, a device performing operations 600 may determine a wireless in-vehicle-network address of the device (i.e., the device's own address) based on a wired in-vehicle-network bus to which the device is connected.

According to aspects of the present disclosure, wirelessly transmitting the data packet directly via the first D2D communication link to the other device as in block 605 may include transmitting simultaneously with a transmission relay transmitting the data packet to the other device.

In aspects of the present disclosure, a device performing operations 600 may receive, over the first or a second D2D communication link, a configuration (e.g., a configuration file indicating which frequencies to measure when and/or a command to measure one or more frequencies at one or more times) for the measurement of interference; and report an interference measurement according to the configuration. The device may also receive a configuration update for the wirelessly transmitting the data packet (e.g., indicating a precoder to use), wherein the configuration update is determined based on the interference measurement.

Figure 7:
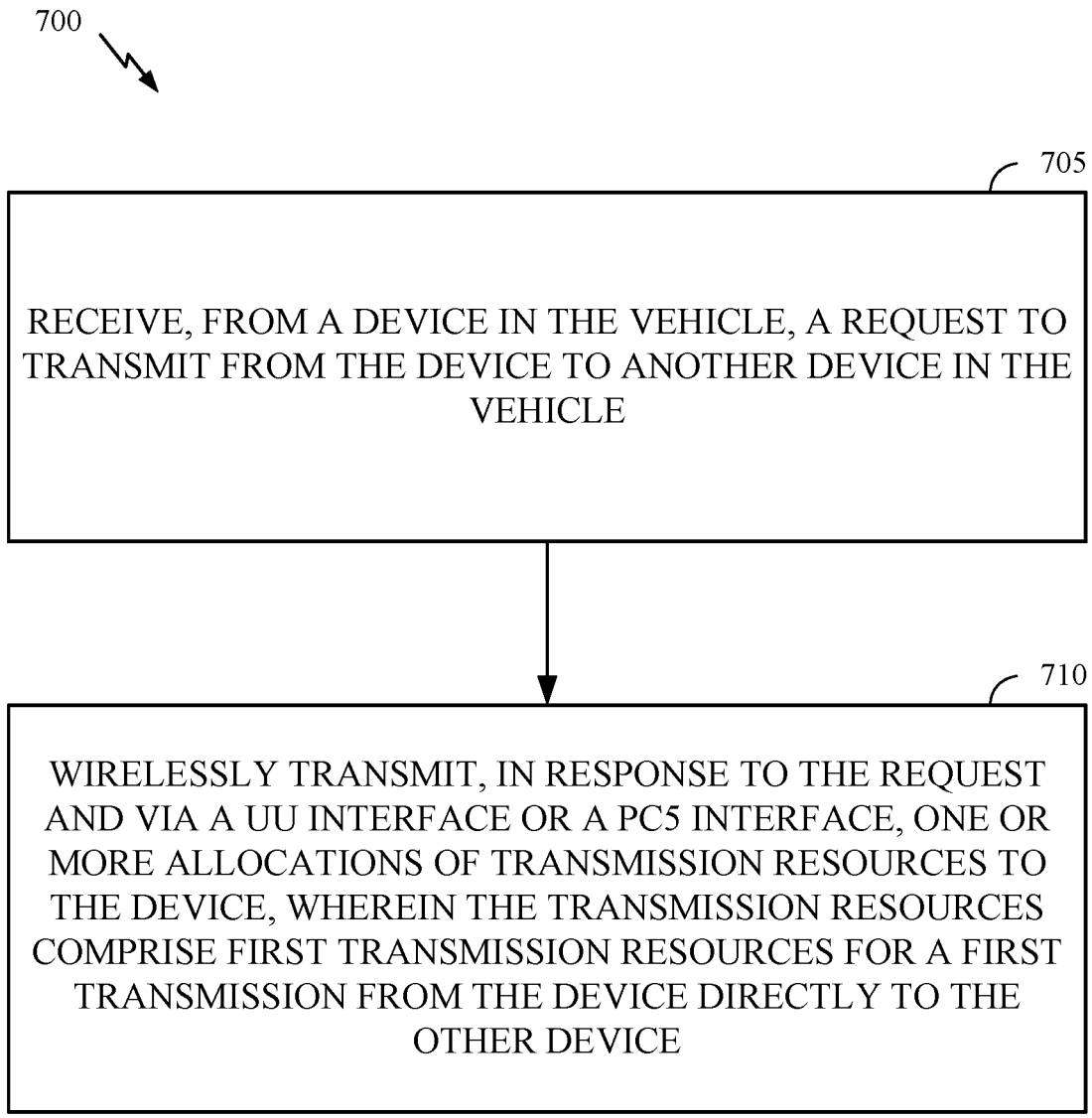
FIG. 7 is a flow diagram illustrating example operations for wireless communication by a central controller in a vehicle, in accordance with certain aspects of the present disclosure.

FIG. 7 is a flow diagram illustrating example operations 700 for wireless communication, in accordance with certain aspects of the present disclosure. The operations 700 may be performed, for example, by a central controller similar to a BS (e.g., such as a BS 110a in the wireless communication network 100 or the central controller 450 in the vehicle 400). Operations 700 may be implemented as software components that are executed and run on one or more processors (e.g., controller/processor 240 of FIG. 2). Further, the transmission and reception of signals by the central controller in operations 700 may be enabled, for example, by one or more antennas (e.g., antennas 234 of FIG. 2). In certain aspects, the transmission and/or reception of signals by the central controller may be implemented via a bus interface of one or more processors (e.g., controller/processor 240) obtaining and/or outputting signals.

The operations 700 may begin, at block 705, by the central controller receiving, from a device in the vehicle, a request to transmit from the device to another device in the vehicle. For example, the central controller may be the wIVN controller 450 of FIG. 4 or the wIVN controller 560 of FIG. 5. In one example, the wIVN controller 450 receives a request from the camera 410a to transmit from the camera 410a to the display 430 in the vehicle 400. Although the camera 410a is used as an example, it should be understood that any one of the door sensors 405a-b, cameras 410a-d, in-cabin sensors 415a-d, engine sensors 420a-b, the exhaust sensor 425, and the display 430 may send requests to the wIVN controller 450 to transmit to another one of the door sensors 405a-b, cameras 410a-d, in-cabin sensors 415a-d, engine sensors 420a-b, the exhaust sensor 425, and the display 430.

Operations 700 continue at block 710 with the central controller wirelessly transmitting, in response to the request and via a Uu interface or a PC5 interface, one or more allocations of transmission resources to the device, wherein the transmission resources comprise first transmission resources for a first transmission from the device directly to the other device. Continuing the example, the wIVN controller 450 may wirelessly transmit, in response to the request from the camera 410a, via a Uu interface or a PC5 interface, one or more allocations of transmission resources to the camera 410a. The transmission resources may include a first transmission resource for a first transmission (e.g., frames of image data) from the camera 410a directly to the display 430.

In aspects of the present disclosure, the transmission resources of block 710 may include second transmission resources for a second transmission from the device to a first transmission relay. The allocation of the transmission resources can be provided to the devices and the first transmission relay individually or provided to both. When the transmission resources information is provided to both, the first transmission relay will receive the transmission from the device via the first transmission resources. The device and the first transmission relay may use the second transmission resources for re-transmission at the same time to the other device. This allows a combined transmission and increases the probability of the other device successfully receiving the transmission. In case there are multiple Relays in the wIVN network, all of them may be configured to perform the re-transmission of the packet using the second resources, and thus improve the probability of correct reception at the other devices of the combined signal. In another aspect of the present disclosure, the re-transmission of the packet is only initiated by the Relay or the original transmitting device if a negative acknowledgement (NACK) is received. In case a positive acknowledgement (ACK) is received for the original transmission, the second transmission resources can be released for other use, e.g., transmission of a new packet, or for interference measurements, etc.

According to aspects of the present disclosure, a central controller performing operations 700 may wirelessly transmit one or more other allocations of transmission resources to the first transmission relay for the first transmission relay to use for a third transmission to the other device.

In aspects of the present disclosure, the allocations of block 705 may include another allocation of the first transmission resources for a second transmission from the first transmission relay to the other device.

In aspects of the present disclosure, a central controller performing operations 700 may receive a data packet from the device and transmit the data packet to the other device.

According to aspects of the present disclosure, a central controller performing operations 700 may wirelessly transmit one or more other allocations of transmission resources to the device for a third transmission to a second transmission relay and wirelessly transmit one or more other allocations of transmission resources to the second transmission relay for the second transmission relay to use for a fourth transmission to the other device.

In aspects of the present disclosure, a central controller performing operations 700 may receive a registration request from the device prior to receiving the request to transmit.

According to aspects of the present disclosure, a central controller performing operations 700 may determine a wireless in-vehicle-network address of the device based on an address of the device on a wired in-vehicle-network bus to which the device is connected.

In aspects of the present disclosure, a central controller performing operations 700 may broadcast an indication of an address of the central controller via a device-to-device (D2D) communication link.

According to aspects of the present disclosure, a central controller performing operations 700 may wirelessly transmit, in response to the request and via a D2D communication link (e.g., a Uu interface or a PC5 interface), another allocation of the first transmission resources to the other device to receive the first transmission via the first transmission resources.

In aspects of the present disclosure, a central controller performing operations 700 may transmit, over a D2D communication link and to the device, a configuration for the measurement of interference (e.g., a configuration file indicating which frequencies to measure when and/or a command to measure one or more frequencies at one or more times); and may receive an interference measurement from the device according to the configuration. According to some aspects of the present disclosure, the central controller may transmit, to the device, a configuration update for transmitting from the device to the other device, wherein the configuration update is determined based on the interference measurement.

Figure 8:
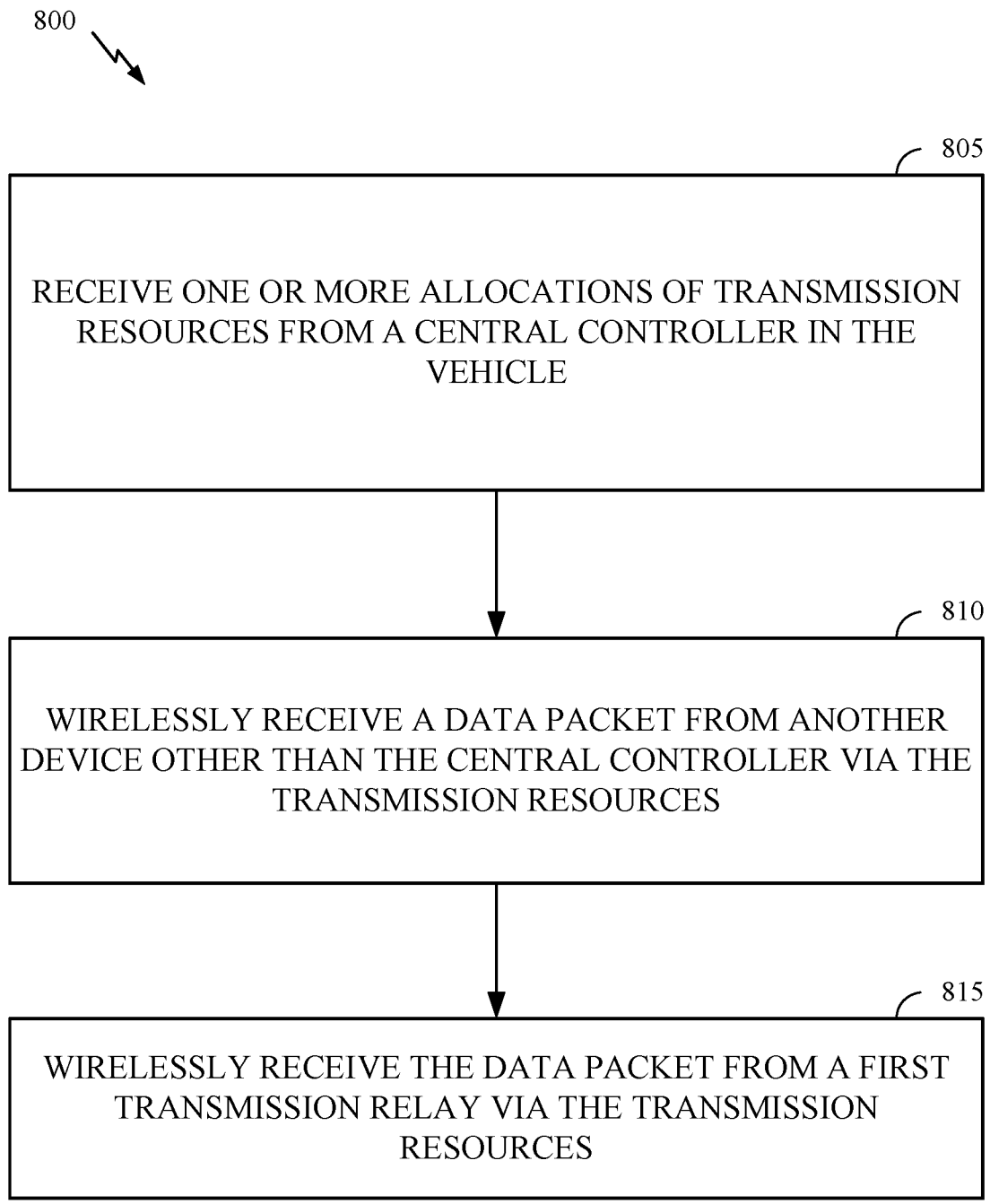
FIG. 8 is a flow diagram illustrating example operations for wireless communication by a receiving device in a vehicle, in accordance with certain aspects of the present disclosure.

FIG. 8 is a flow diagram illustrating example operations 800 for wireless communication, in accordance with certain aspects of the present disclosure. The operations 800 may be performed, for example, by a device in a vehicle (e.g., such as the UE 120a in the wireless communication network 100 or the device 410b in the vehicle 400). Operations 800 may be implemented as software components that are executed and run on one or more processors (e.g., controller/processor 280 of FIG. 2). Further, the transmission and reception of signals by the device in operations 800 may be enabled, for example, by one or more antennas (e.g., antennas 252 of FIG. 2). In certain aspects, the transmission and/or reception of signals by the device may be implemented via a bus interface of one or more processors (e.g., controller/processor 280) obtaining and/or outputting signals.

The operations 800 may begin, at block 805, by the device receiving one or more allocations of transmission resources from a central controller in the vehicle. For example, the receiving device may be one of the door sensors 405a-b, cameras 410a-d, in-cabin sensors 415a-d, engine sensors 420a-b, the exhaust sensor 425, and the display 430 of the vehicle 400 shown in FIG. 4. The central controller may be the wIVN controller 450. In one example, the display 430 receives one or more allocations of transmission resources from the wIVN controller 450 in the vehicle 400.

At block 810, the device wirelessly receives a data packet from another device other than the central controller via the transmission resources. Continuing the example, the display 430 wirelessly receives a data packet from one of the door sensors 405a-b, cameras 410a-d, in-cabin sensors 415a-d, engine sensors 420a-b, and the exhaust sensor 425 via the transmission resources (i.e., the transmission resources of the one or more allocations from the wIVN controller 450 in block 805).

Operations 800 continue at block 815 with the device wirelessly receiving the data packet from a first transmission relay via the transmission resources. Continuing the example, the display 430 wirelessly receives the data packet from a first transmission relay via the transmission resources (i.e., the transmission resources of the one or more allocations from the wIVN controller 450 in block 805). The first transmission relay can be the relay 460 in the vehicle 400 or the BS 110a in the wireless communication network 100.

According to aspects of the present disclosure, the one or more allocations of transmission resources of block 805 may include first transmission resources and second transmission resources; wirelessly receiving the data packet from the other device, as in block 810, may include wirelessly receiving the data packet via the first transmission resources; and wirelessly receiving the data packet from the first transmission relay, as in block 815, may include wirelessly receiving the data packet via the second transmission resources.

According to aspects of the present disclosure, wirelessly receiving the data packet from the first transmission relay, as in block 815, may include wirelessly receiving the data packet from the central controller.

In aspects of the present disclosure, a device performing operations 800 may also wirelessly receive the data packet from a second transmission relay via the transmission resources.

According to aspects of the present disclosure, a device performing operations 800 may register with the central controller prior to receiving the one or more allocations.

In aspects of the present disclosure, a device performing operations 800 may determine a wireless in-vehicle-network address of the device based on a wired in-vehicle-network bus to which the device is connected.

According to aspects of the present disclosure, a device performing operations 800 may power-on one or more components of the device in response to receiving the allocations.

In aspects of the present disclosure, wirelessly receiving the data packet from the first transmission relay as in block 815 may include receiving the data packet from the first transmission relay and the other device simultaneously.

According to aspects of the present disclosure, receiving the one or more allocations of the transmission resources as in block 805 may include receiving the one or more allocations of the transmission resources via a device-to-device (D2D) communication link.

In aspects of the present disclosure, a device performing operations 800 may receive, over a device-to-device (D2D) communication link, a configuration for the measurement of interference (e.g., a configuration file indicating which frequencies to measure when and/or a command to measure one or more frequencies at one or more times); and may report an interference measurement according to the configuration.

Figure 9:
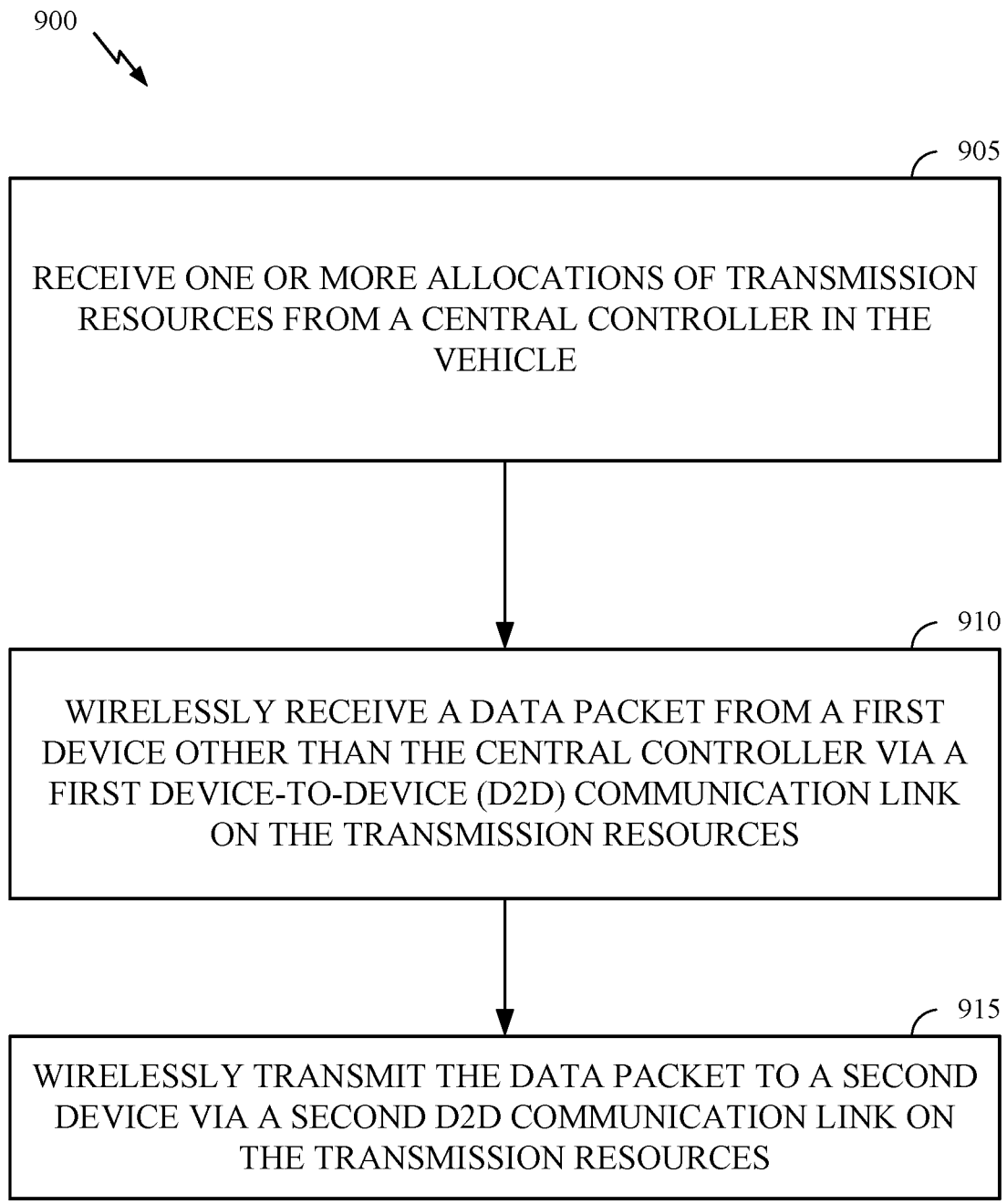
FIG. 9 is a flow diagram illustrating example operations for wireless communication by a relay in a vehicle, in accordance with certain aspects of the present disclosure.

FIG. 9 is a flow diagram illustrating example operations 900 for wireless communication, in accordance with certain aspects of the present disclosure. The operations 900 may be performed, for example, by a transmission relay in a vehicle (e.g., such as the BS 110a in the wireless communication network 100 or the relay 460 in the vehicle 400). Operations 900 may be implemented as software components that are executed and run on one or more processors (e.g., controller/processor 240 of FIG. 2). Further, the transmission and reception of signals by the transmission relay in operations 900 may be enabled, for example, by one or more antennas (e.g., antennas 234 of FIG. 2). In certain aspects, the transmission and/or reception of signals by the transmission relay may be implemented via a bus interface of one or more processors (e.g., controller/processor 240) obtaining and/or outputting signals.

The operations 900 may begin, at block 905, by the transmission relay receiving one or more allocations of transmission resources from a central controller in the vehicle. For example, the transmission relay may be the relay 460 that receives one or more allocations of transmission resources from the wIVN controller 450 in the vehicle 400.

At block 910, the transmission relay wirelessly receives a data packet from a first device other than the central controller via a first device-to-device (D2D) communication link on the transmission resources. Continuing the example, the relay 460 receives a data packet from one of the door sensors 405a-b, cameras 410a-d, in-cabin sensors 415a-d, engine sensors 420a-b, the exhaust sensor 425, and the display 430 of the vehicle 400 via a first D2D communication link on the transmission resources (i.e., the transmission resources of the one or more allocations from the wIVN controller 450 in block 905).

Operations 900 continue at block 915 with the transmission relay wirelessly transmitting the data packet to a second device via a second D2D communication link on the transmission resources. Continuing the example, the relay 460 wirelessly transmits the data packet to another device, such as another one of the door sensors 405a-b, cameras 410a-d, in-cabin sensors 415a-d, engine sensors 420a-b, the exhaust sensor 425, and the display 430 of the vehicle 400, via a second D2D communication link on the transmission resources (i.e., the transmission resources of the one or more allocations from the wIVN controller 450 in block 905).

According to aspects of the present disclosure, the one or more allocations of transmission resources of block 905 may include first transmission resources and second transmission resources; wirelessly receiving the data packet from the first device, as in block 910, may include wirelessly receiving the data packet via the first D2D communication link on the first transmission resources; and wirelessly transmitting the data packet to the second device, as in block 915, may include wirelessly transmitting the data packet via the second D2D communication link on the second transmission resources.

In aspects of the present disclosure, wirelessly transmitting the data packet to the second device as in block 915 may include transmitting simultaneously with the first device transmitting the data packet to the second device.

In aspects of the present disclosure, wirelessly transmitting the data packet to the second device, as in block 915, may include wirelessly transmitting the data packet to the central controller.

According to aspects of the present disclosure, a transmission relay performing operations 900 may register with the central controller prior to receiving the one or more allocations.

According to aspects of the present disclosure, a transmission relay performing operations 900 may determine a wireless in-vehicle-network address of the transmission relay based on a wired in-vehicle-network bus to which the transmission relay is connected.

In aspects of the present disclosure, a transmission relay performing operations 900 may receive, over a third D2D communication link, a configuration for the measurement of interference (e.g., a configuration file indicating which frequencies to measure when and/or a command to measure one or more frequencies at one or more times); and the transmission relay may report an interference measurement according to the configuration. According to some aspects of the present disclosure, the transmission relay may receiving a configuration update for the wirelessly transmitting the data packet as in block 915, wherein the configuration update is determined based on the interference measurement.

Figure 10:
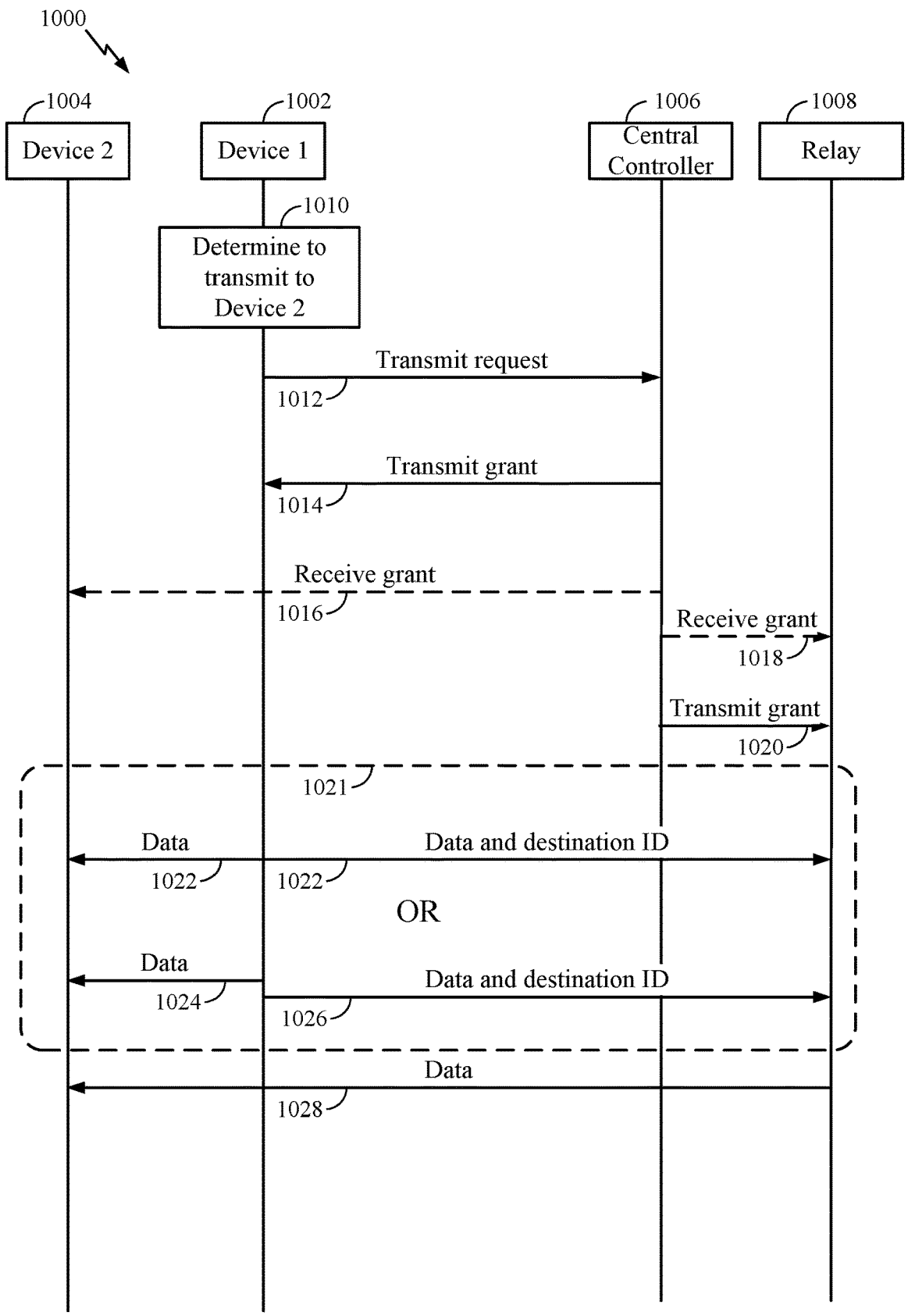
FIG. 10 is a call flow diagram illustrating example signaling for wireless in-vehicle networks, in accordance with aspects of the present disclosure.

FIG. 10 is an exemplary call flow 1000 of an exemplary wIVN, according to aspects of the present disclosure. The exemplary wIVN includes a first device (e.g., a camera or sensor) 1002, a second device (e.g., a display or engine controller) 1004, a central controller 1006, and a relay 1008. At 1010, the first device determines to transmit data to the second device. At 1012, the first device sends a transmit request to the central controller. At 1014, the central controller transmits a grant of first transmission resources and optionally second transmission resources to the first device in response to the transmit request 1012. At 1016, the central controller optionally transmits a receive grant for the first transmission resources and third transmission resources to the second device. At 1018, the central controller optionally transmits another receive grant to the relay for the first transmission resources or optionally the second transmission resources. At 1020, the central controller transmits a grant of the third transmission resources to the relay. As described below, in block 1021 the first device transmits the data to the second device via the first transmission resources. In block 1021, the first device also transmits the data and an identifier for the second device (destination ID) to the relay via the first transmission resources or the second transmission resources. The first device may send the data and the identifier in a single broadcast transmission 1022 so that both the second device and the relay receive the data and the identifier. Alternatively, the first device may send the data to the second device in a first transmission 1024 via the first transmission resources, and the first device may send the data and the identifier to the relay in a second transmission 1026 via the second transmission resources. At 1028, the relay sends the data to the second device via the third transmission resources.

Figure 11:
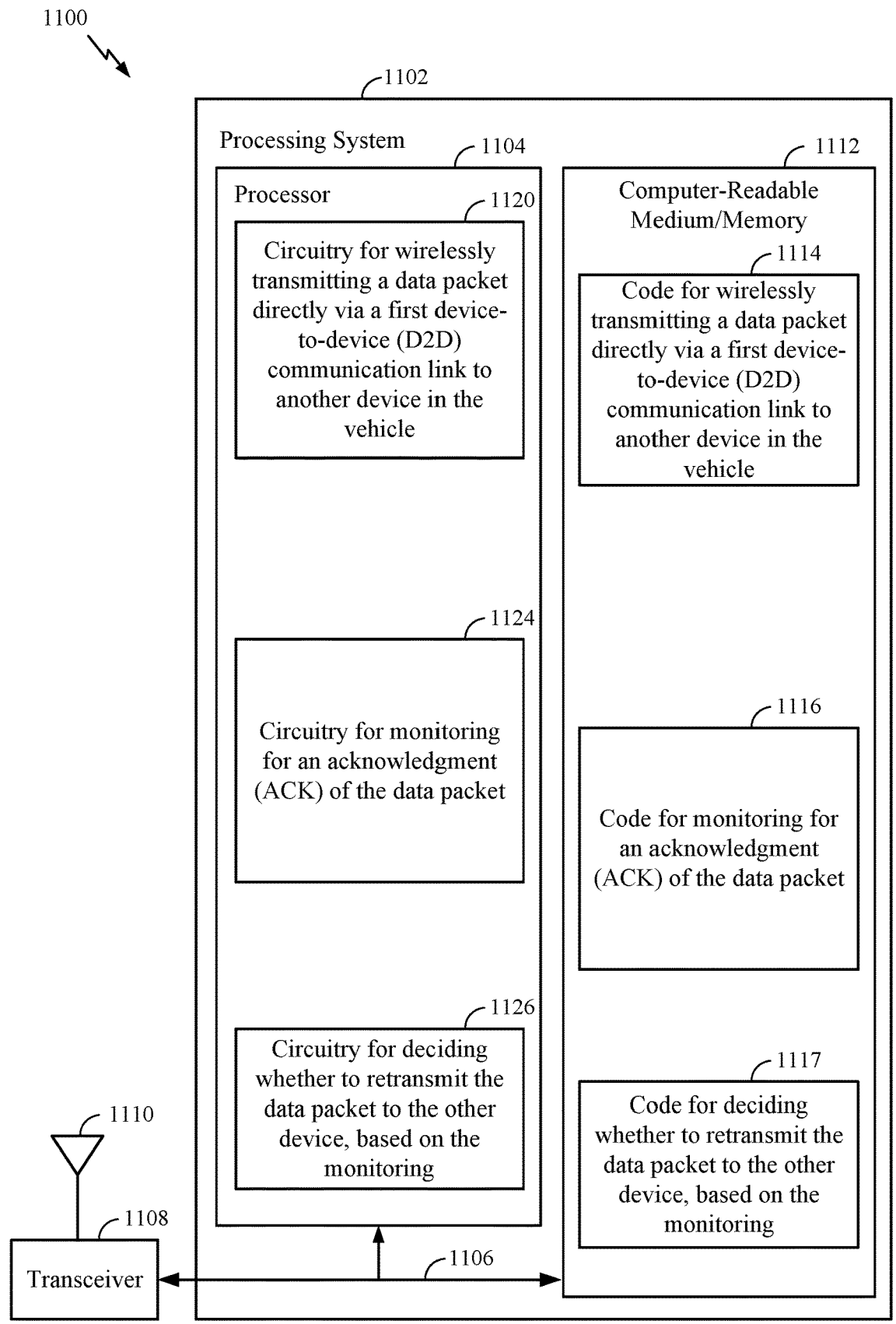
FIG. 11 illustrates a communications device that may include various components configured to perform the operations shown in FIG. 6, in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 6. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 6, or other operations for performing the various techniques discussed herein for wireless in-vehicle networking. In certain aspects, computer-readable medium/memory 1112 stores code 1114 for wirelessly transmitting a data packet directly via device-to-device (D2D) communication to another device in the vehicle; code 1116 for monitoring for an acknowledgment (ACK) of the data packet; and code 1117 for deciding whether to retransmit the data packet to the other device, based on the monitoring. In certain aspects, the processor 1104 has circuitry configured to implement the code stored in the computer-readable medium/memory 1112. The processor 1104 includes circuitry 1120 for wirelessly transmitting a data packet directly via device-to-device (D2D) communication to another device in the vehicle; circuitry 1124 for monitoring for an acknowledgment (ACK) of the data packet; and circuitry 1126 for deciding whether to retransmit the data packet to the other device, based on the monitoring.

Figure 12:
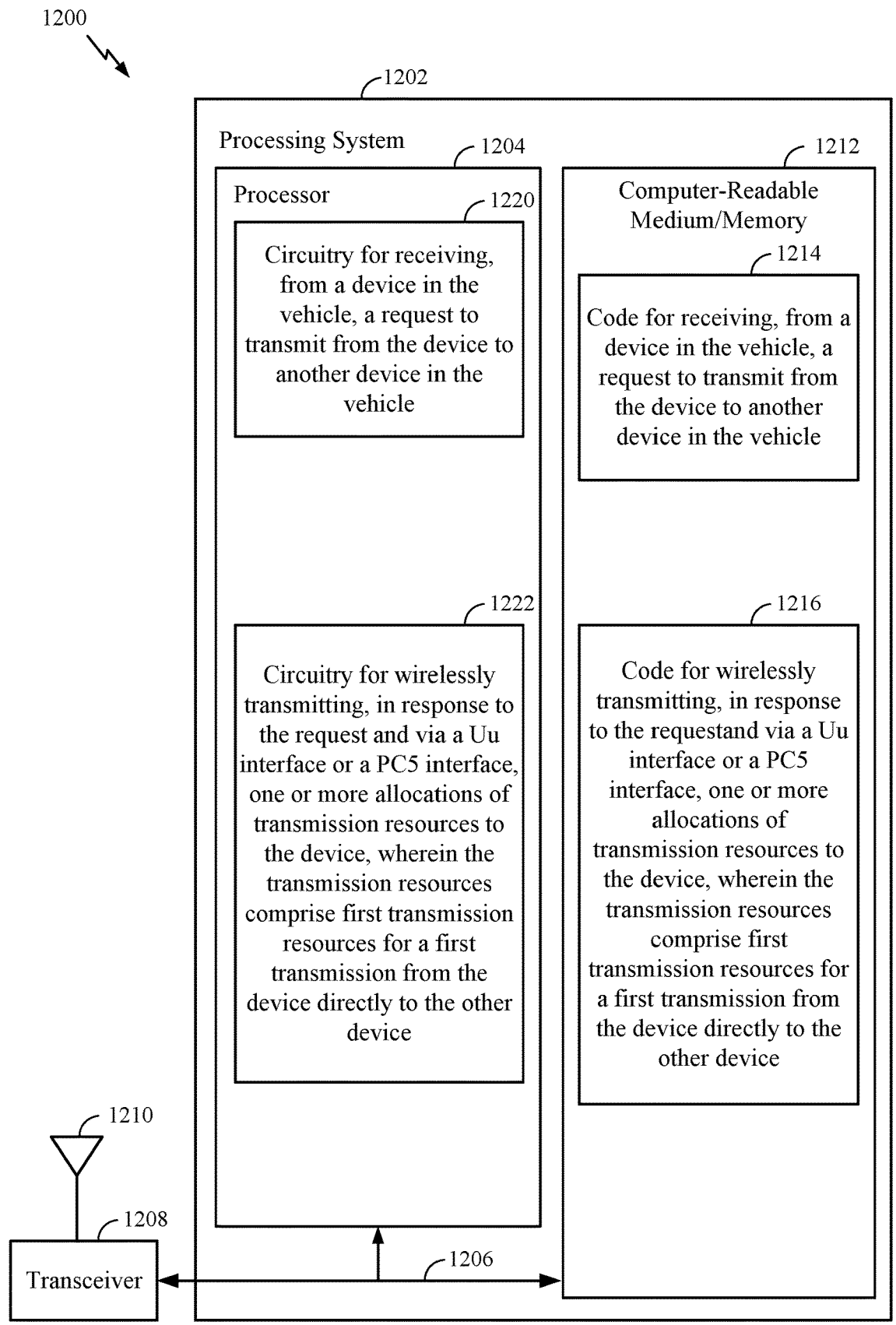
FIG. 12 illustrates a communications device that may include various components configured to perform the operations shown in FIG. 7, in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 7. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 7, or other operations for performing the various techniques discussed herein for wireless in-vehicle networking. In certain aspects, computer-readable medium/memory 1212 stores code 1214 for receiving, from a device in the vehicle, a request to transmit from the device to another device in the vehicle; and code 1216 for wirelessly transmitting, in response to the request and via a Uu interface or a PC5 interface, one or more allocations of transmission resources to the device, wherein the transmission resources comprise first transmission resources for a first transmission from the device directly to the other device. In certain aspects, the processor 1204 has circuitry configured to implement the code stored in the computer-readable medium/memory 1212. The processor 1204 includes circuitry 1220 for receiving, from a device in the vehicle, a request to transmit from the device to another device in the vehicle; and circuitry 1222 for wirelessly transmitting, in response to the request and via a Uu interface or a PC5 interface, one or more allocations of transmission resources to the device, wherein the transmission resources comprise first transmission resources for a first transmission from the device directly to the other device.

Figure 13:
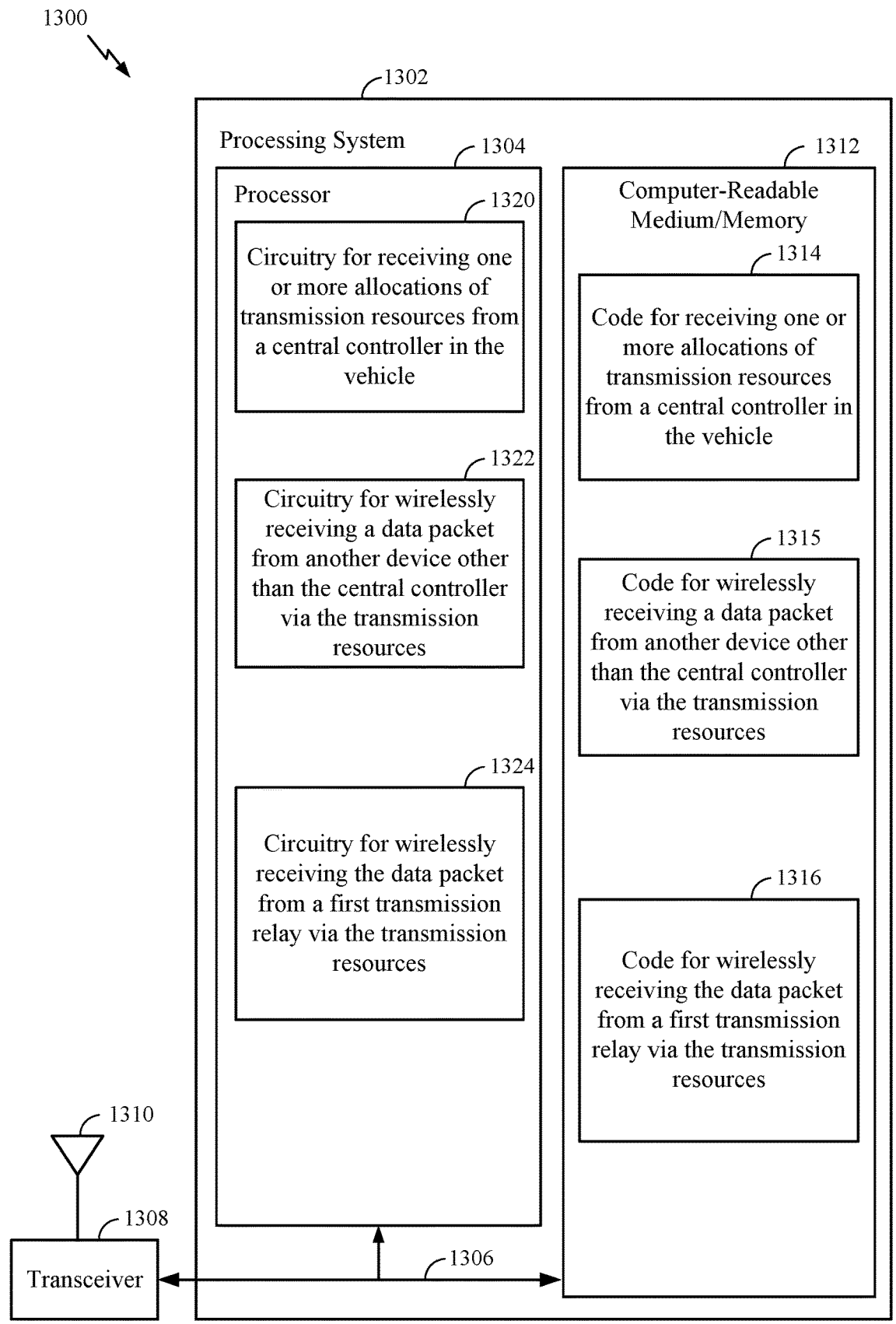
FIG. 13 illustrates a communications device that may include various components configured to perform the operations shown in FIG. 8, in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 8. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 8, or other operations for performing the various techniques discussed herein for wireless in-vehicle networking. In certain aspects, computer-readable medium/memory 1312 stores code 1314 for receiving one or more allocations of transmission resources from a central controller in the vehicle; code 1315 for wirelessly receiving a data packet from another device other than the central controller via the transmission resources; and code 1316 for wirelessly receiving the data packet from a first transmission relay via the transmission resources. In certain aspects, the processor 1304 has circuitry configured to implement the code stored in the computer-readable medium/memory 1312. The processor 1304 includes circuitry 1320 for receiving one or more allocations of transmission resources from a central controller in the vehicle; circuitry 1322 for wirelessly receiving a data packet from another device other than the central controller via the transmission resources; and circuitry 1324 for wirelessly receiving the data packet from a first transmission relay via the transmission resources.

Figure 14:
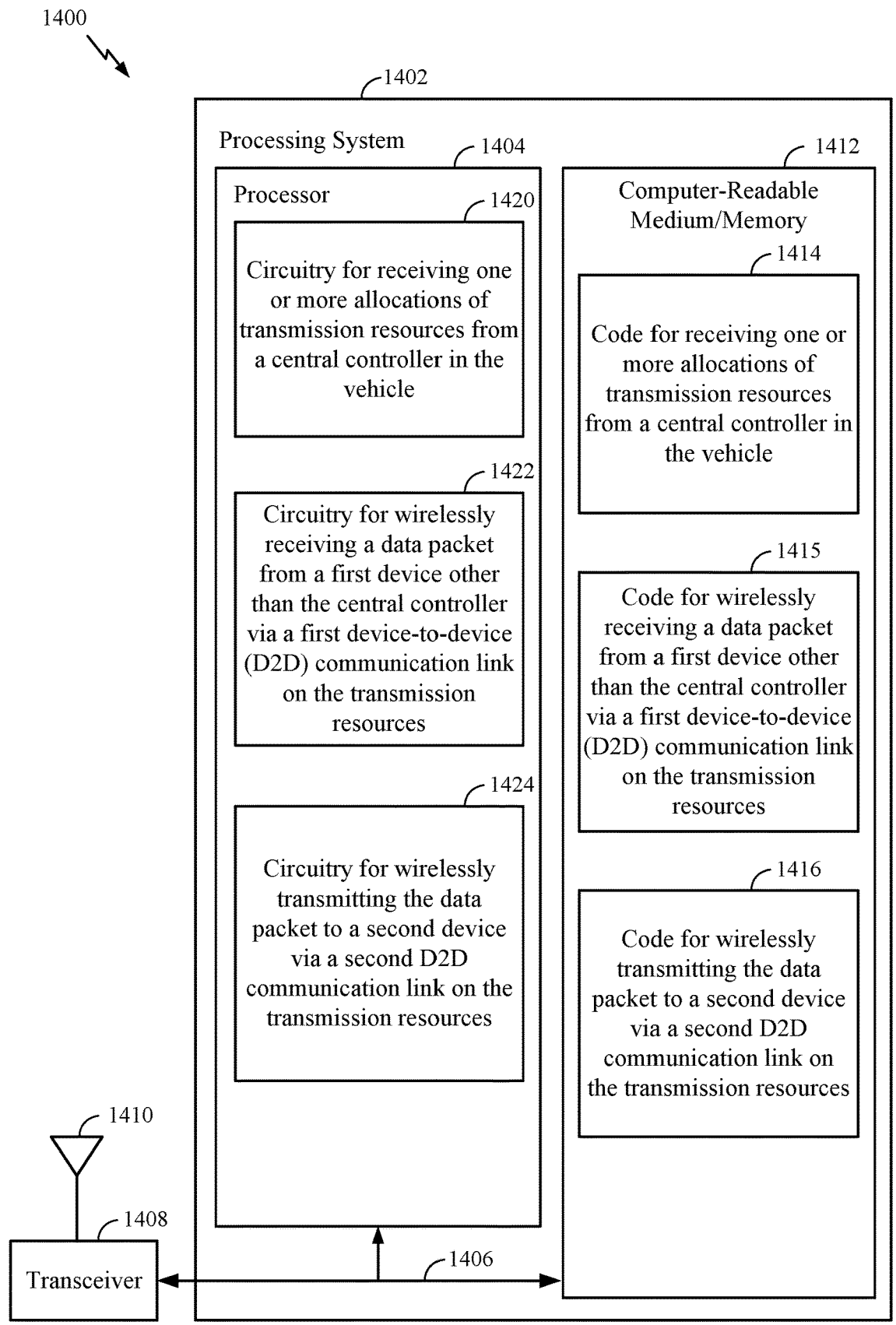
FIG. 14 illustrates a communications device that may include various components configured to perform the operations shown in FIG. 9, in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 9. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 9, or other operations for performing the various techniques discussed herein for wireless in-vehicle networking. In certain aspects, computer-readable medium/memory 1412 stores code 1414 for receiving one or more allocations of transmission resources from a central controller in the vehicle; code 1415 for wirelessly receiving a data packet from a first device other than the central controller via device-to-device (D2D) communication on the transmission resources; and code 1416 for wirelessly transmitting the data packet to a second device via D2D communication on the transmission resources. In certain aspects, the processor 1404 has circuitry configured to implement the code stored in the computer-readable medium/memory 1412. The processor 1404 includes circuitry 1420 for receiving one or more allocations of transmission resources from a central controller in the vehicle; circuitry 1422 for wirelessly receiving a data packet from a first device other than the central controller via device-to-device (D2D) communication on the transmission resources; and circuitry 1424 for wirelessly transmitting the data packet to a second device via D2D communication on the transmission resources.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6, FIG. 7, FIG. 8, and/or FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

Example Aspects of Wireless In-Vehicle Networking Architecture

In a first aspect, a method for wireless communications performed by a device in a vehicle, includes: wirelessly transmitting a data packet directly via a first device-to-device (D2D) communication link to another device in the vehicle; monitoring for an acknowledgment (ACK) of the data packet; deciding whether to retransmit the data packet to the other device, based on the monitoring; and wirelessly transmitting the data packet to a transmission relay, wherein an intended destination of the data packet is the other device, wherein the monitoring for the ACK comprises monitoring for a first ACK from the other device and a second ACK from the transmission relay.

In a second aspect, in combination with the first aspect, wirelessly transmitting the data packet directly via the first D2D communication link to the other device comprises transmitting simultaneously with a transmission relay transmitting the data packet to the other device.

In a third aspect, in combination with one or more of the first and second aspects, the method includes receiving an allocation of first transmission resources from a central controller in the vehicle, wherein wirelessly transmitting the data packet directly to the other device comprises transmitting the data packet via the first transmission resources; and receiving an allocation of second transmission resources from the central controller, wherein wirelessly transmitting the data packet to the transmission relay comprises transmitting the data packet via the second transmission resources.

In a fourth aspect, in combination with the third aspect, the method includes: transmitting a request for the allocation of first transmission resources and the allocation of second transmission resources to the central controller.

In a fifth aspect, in combination with the third aspect, the method includes: registering with the central controller using pre-configured security certificates prior to receiving the allocation of the first transmission resources or the allocation of the second transmission resources.

In a sixth aspect, in combination with the third aspect, receiving the allocation of the first transmission resources comprises receiving the allocation of the first transmission resources via a second D2D communication link; and receiving the allocation of the second transmission resources comprises receiving the allocation of the second transmission resources via the second D2D communication link or a third D2D communication link.

In a seventh aspect, in combination with the sixth aspect, the method includes discovering an address of the central controller based on a broadcast via one of the first, the second, the third, or a fourth D2D communication links.

In an eighth aspect, in combination with the one or more of the first through seventh aspects, the method includes: determining a wireless in-vehicle-network address of the device based on a wired in-vehicle-network bus to which the device is connected, wherein determining the wireless in-vehicle-network address of the device comprises mapping the wireless in-vehicle-network address to the wired in-vehicle-network bus.

In a ninth aspect, in combination with one or more of the first through eighth aspects, the method includes: receiving, over the first or a second D2D communication link, a configuration for measurement of interference; and reporting an interference measurement according to the configuration.

In a tenth aspect, in combination with the ninth aspect, the method includes receiving a configuration update for the wirelessly transmitting the data packet, wherein the configuration update is determined based on the reporting the interference measurement.

In an eleventh aspect, a method for wireless communication performed by a central controller in a vehicle, includes: receiving, from a device in the vehicle, a request to transmit from the device to another device in the vehicle; and wirelessly transmitting, in response to the request, one or more allocations of transmission resources to the device, wherein the transmission resources comprise first transmission resources for a first transmission from the device directly to the other device, wherein the transmission resources further comprise second transmission resources for a second transmission from the device to a first transmission relay.

In a twelfth aspect, in combination with the eleventh aspect, the allocations comprise another allocation of the first transmission resources for a second transmission from the first transmission relay to the other device.

In a thirteenth aspect, in combination with one or more of the eleventh and the twelfth aspects, the method includes wirelessly transmitting one or more other allocations of transmission resources to the first transmission relay for the first transmission relay to use for a third transmission to the other device.

In a fourteenth aspect, in combination with one or more of the eleventh through the twelfth aspects, the method includes: wirelessly transmitting one or more other allocations of transmission resources to the device for a third transmission to a second transmission relay; and wirelessly transmitting one or more other allocations of transmission resources to the second transmission relay for the second transmission relay to use for a fourth transmission to the other device.

In a fifteenth aspect, in combination with one or more of the eleventh through fourteenth aspects, the method includes receiving a registration request from the device prior to receiving the request to transmit.

In a sixteenth aspect, in combination with one or more of the eleventh through fifteenth aspects, the method includes: determining a wireless in-vehicle-network address of the device based on an address of the device on a wired in-vehicle-network bus to which the device is connected, wherein determining the wireless in-vehicle-network address of the device comprises mapping the wireless in-vehicle-network address to the wired in-vehicle-network bus.

In a seventeenth aspect, in combination with one or more of the eleventh through sixteenth aspects, the method includes: wirelessly transmitting, in response to the request and via a device-to-device (D2D) communication link, another allocation of the first transmission resources to the other device to receive the first transmission via the first transmission resources; transmitting, over a device-to-device (D2D) communication link and to the device, a configuration for measurement of interference; and receiving an interference measurement from the device according to the configuration.

In an eighteenth aspect, in combination with the seventeenth aspect, the method includes transmitting, to the device, a configuration update for transmitting from the device to the other device, wherein the configuration update is determined based on the interference measurement.

In a nineteenth aspect, a method for wireless communications performed by a device in a vehicle, includes: receiving one or more allocations of transmission resources from a central controller in the vehicle; wirelessly receiving a data packet from another device other than the central controller via the transmission resources; and wirelessly receiving the data packet from a first transmission relay via the transmission resources.

In a twentieth aspect, in combination with the nineteenth aspect, the one or more allocations of transmission resources comprise first transmission resources and second transmission resources; wirelessly receiving the data packet from the other device comprises wirelessly receiving the data packet via the first transmission resources; and wirelessly receiving the data packet from the first transmission relay comprises wirelessly receiving the data packet via the second transmission resources.

In a twenty-first aspect, in combination with the nineteenth aspect, the method includes registering with the central controller using pre-configured security certificates prior to receiving the one or more allocations.

In a twenty-second aspect, in combination with the nineteenth aspect, the method includes determining a wireless in-vehicle-network address of the device based on a wired in-vehicle-network bus to which the device is connected, wherein determining the wireless in-vehicle-network address of the device comprises mapping the wireless in-vehicle-network address to the wired in-vehicle-network bus.

In a twenty-third aspect, in a wireless communications system, in combination with one or more of the nineteenth through twenty-second aspects, the method includes powering-on one or more components of the device in response to receiving the allocations.

In a twenty-fourth aspect, in combination with one or more of the nineteenth through twenty-third aspects, the method includes wirelessly receiving the data packet from the first transmission relay comprises receiving the data packet from the first transmission relay and the other device simultaneously.

In a twenty-fifth aspect, a method for wireless communications performed by a transmission relay in a vehicle, includes: receiving one or more allocations of transmission resources from a central controller in the vehicle; wirelessly receiving a data packet from a first device via a first device-to-device (D2D) communication link on the transmission resources; and wirelessly transmitting the data packet to a second device via a second D2D communication link on the transmission resources.

In a $26^{th}$ aspect, in combination with the twenty-fifth aspect, the one or more allocations of transmission resources comprise first transmission resources and second transmission resources; wirelessly receiving the data packet from the first device comprises wirelessly receiving the data packet via the first D2D communication link on the first transmission resources; and wirelessly transmitting the data packet to the second device comprises wirelessly transmitting the data packet via the second D2D communication link on the second transmission resources.

In a $27^{th}$ aspect, in combination with the twenty-fifth aspect, wirelessly transmitting the data packet to the second device comprises transmitting simultaneously with the first device transmitting the data packet to the second device.

In a $28^{th}$ aspect, in combination with one or more of the twenty-fifth through $27^{th}$ aspects, the method includes: registering with the central controller using pre-configured security certificates prior to receiving the one or more allocations.

In a $29^{th}$ aspect, in combination with one or more of the twenty-fifth through $28^{th}$ aspects, the method includes: determining a wireless in-vehicle-network address of the transmission relay based on a wired in-vehicle-network bus to which the transmission relay is connected, wherein determining the wireless in-vehicle-network address of the transmission relay comprises mapping the wireless in-vehicle-network address to the wired in-vehicle-network bus.

In a $30^{th}$ aspect, in combination with one or more of the twenty-fifth through $29^{th}$ aspects, the method includes: receiving, over a third D2D communication link, a configuration for measurement of interference; reporting an interference measurement according to the configuration; and receiving a configuration update for the wirelessly transmitting the data packet, wherein the configuration update is determined based on the interference measurement.

In a 31$^{st}$ aspect, a method for communications performed by a device in a vehicle, includes: wirelessly transmitting a data packet directly via a first device-to-device (D2D) communication link to another device in the vehicle; monitoring for an acknowledgment (ACK) of the data packet; deciding whether to retransmit the data packet to the other device, based on the monitoring; and wirelessly transmitting the data packet to a transmission relay, wherein an intended destination of the data packet is the other device, wherein the monitoring for the ACK comprises monitoring for a first ACK from the other device and a second ACK from the transmission relay.

In a 32$^{nd}$ aspect, in combination with the 31$^{st}$ aspect, wirelessly transmitting the data packet directly via the first D2D communication link to the other device comprises transmitting simultaneously with a transmission relay transmitting the data packet to the other device.

In a 33$^{rd}$ aspect, in combination with one or more of the 31$^{st}$ through 32$^{nd}$ aspects, the method includes: receiving an allocation of first transmission resources from a central controller in the vehicle, wherein wirelessly transmitting the data packet directly to the other device comprises transmitting the data packet via the first transmission resources; and receiving an allocation of second transmission resources from the central controller, wherein wirelessly transmitting the data packet to the transmission relay comprises transmitting the data packet via the second transmission resources.

In a 34$^{th}$ aspect, in combination with one or more of the 31$^{st}$ through 33$^{rd}$ aspects, the method includes: transmitting a request for the allocation of first transmission resources and the allocation of second transmission resources to the central controller.

In a 35$^{th}$ aspect, in combination with one or more of the 31$^{st}$ through 34$^{th}$ aspects, the method includes: registering with the central controller using pre-configured security certificates prior to receiving the allocation of the first transmission resources or the allocation of the second transmission resources.

In a 36$^{th}$ aspect, in combination with one or more of the 31$^{st}$ through 35$^{th}$ aspects, the method includes: receiving the allocation of the first transmission resources comprises receiving the allocation of the first transmission resources via a second D2D communication link; and receiving the allocation of the second transmission resources comprises receiving the allocation of the second transmission resources via the second D2D communication link or a third D2D communication link.

In a 37$^{th}$ aspect, in combination with one or more of the 31$^{st}$ through 36$^{th}$ aspects, the method includes: discovering an address of the central controller based on a broadcast via one of the first, the second, the third, or a fourth D2D communication links.

In a 38$^{th}$ aspect, in combination with one or more of the 31$^{st}$ through 37$^{th}$ aspects, the method includes: determining a wireless in-vehicle-network address of the device based on a wired in-vehicle-network bus to which the device is connected, wherein determining the wireless in-vehicle-network address of the device comprises mapping the wireless in-vehicle-network address to the wired in-vehicle-network bus.

In a 39$^{th}$ aspect, in combination with one or more of the 31$^{st}$ through 38$^{th}$ aspects, the method includes: receiving, over the first or a second D2D communication link, a configuration for measurement of interference; and reporting an interference measurement according to the configuration.

In a 40$^{th}$ aspect, in combination with one or more of the 31$^{st}$ through 39$^{th}$ aspects, the method includes: receiving a configuration update for the wirelessly transmitting the data packet, wherein the configuration update is determined based on the reporting the interference measurement.

In a 41$^{st}$ aspect, a method for wireless communications performed by a central controller in a vehicle, includes: receiving, from a device in the vehicle, a request to transmit from the device to another device in the vehicle; and wirelessly transmitting, in response to the request, one or more allocations of transmission resources to the device, wherein the transmission resources comprise first transmission resources for a first transmission from the device directly to the other device, wherein the transmission resources further comprise second transmission resources for a second transmission from the device to a first transmission relay.

In a 42$^{nd}$ aspect, in combination with the 41$^{st}$ aspect, the allocations comprise another allocation of the first transmission resources for a second transmission from the first transmission relay to the other device.

In a 43$^{rd}$ aspect, in combination with one or more of the 41$^{st}$ through 42$^{nd}$ aspects, the method includes: wirelessly transmitting one or more other allocations of transmission resources to the first transmission relay for the first transmission relay to use for a third transmission to the other device.

In a 44$^{th}$ aspect, in combination with one or more of the 41$^{st}$ through 43$^{rd}$ aspects, the method includes: wirelessly transmitting one or more other allocations of transmission resources to the device for a third transmission to a second transmission relay; and wirelessly transmitting one or more other allocations of transmission resources to the second transmission relay for the second transmission relay to use for a fourth transmission to the other device.

In a 45$^{th}$ aspect, in combination with one or more of the 41$^{st}$ through 44$^{th}$ aspects, the method includes: receiving a registration request from the device prior to receiving the request to transmit.

In a 46$^{th}$ aspect, in combination with one or more of the 41$^{st}$ through 45$^{th}$ aspects, the method includes: determining a wireless in-vehicle-network address of the device based on an address of the device on a wired in-vehicle-network bus to which the device is connected, wherein determining the wireless in-vehicle-network address of the device comprises mapping the wireless in-vehicle-network address to the wired in-vehicle-network bus.

In a 47$^{th}$ aspect, in combination with one or more of the 41$^{st}$ through 46$^{th}$ aspects, the method includes: wirelessly transmitting, in response to the request and via a device-to-device (D2D) communication link, another allocation of the first transmission resources to the other device to receive the first transmission via the first transmission resources; transmitting, over a device-to-device (D2D) communication link and to the device, a configuration for measurement of interference; and receiving an interference measurement from the device according to the configuration.

In a 48$^{th}$ aspect, in combination with one or more of the 41$^{st}$ through 47$^{th}$ aspects, the method includes: transmitting, to the device, a configuration update for transmitting from the device to the other device, wherein the configuration update is determined based on the interference measurement.

In a 49th aspect, a method for wireless communications performed by a device in a vehicle, includes: receiving one or more allocations of transmission resources from a central controller in the vehicle; wirelessly receiving a data packet from another device other than the central controller via the transmission resources; and wirelessly receiving the data packet from a first transmission relay via the transmission resources.

In a 50th aspect, in combination with the 49th aspect, the one or more allocations of transmission resources comprise first transmission resources and second transmission resources; wirelessly receiving the data packet from the other device comprises wirelessly receiving the data packet via the first transmission resources; and wirelessly receiving the data packet from the first transmission relay comprises wirelessly receiving the data packet via the second transmission resources.

In a 51st aspect, in combination with one or more of the 49th through 50th aspects, the method includes: registering with the central controller using pre-configured security certificates prior to receiving the one or more allocations.

In a 52nd aspect, in combination with one or more of the 49th through 51st aspects, the method includes: determining a wireless in-vehicle-network address of the device based on a wired in-vehicle-network bus to which the device is connected, wherein determining the wireless in-vehicle-network address of the device comprises mapping the wireless in-vehicle-network address to the wired in-vehicle-network bus.

In a 53rd aspect, in combination with one or more of the 49th through 52nd aspects, the method includes: powering-on one or more components of the device in response to receiving the allocations.

In a 54th aspect, in combination with one or more of the 49th through 53rd aspects, the apparatus includes means for transmitting to the UE the index corresponding to the CSI-RS pattern prior to transmitting the CSI-RSs using the CSI-RS pattern.

In a 55th aspect, a method for wireless communications performed by a transmission relay in a vehicle, includes: receiving one or more allocations of transmission resources from a central controller in the vehicle; wirelessly receiving a data packet from a first device via a first device-to-device (D2D) communication link on the transmission resources; and wirelessly transmitting the data packet to a second device via a second D2D communication link on the transmission resources.

In a 56th aspect, in combination with the 55th aspect, the one or more allocations of transmission resources comprise first transmission resources and second transmission resources; wirelessly receiving the data packet from the first device comprises wirelessly receiving the data packet via the first D2D communication link on the first transmission resources; and wirelessly transmitting the data packet to the second device comprises wirelessly transmitting the data packet via the second D2D communication link on the second transmission resources.

In a 57th aspect, in combination with one or more of the 55th through 56th aspects, wirelessly transmitting the data packet to the second device comprises transmitting simultaneously with the first device transmitting the data packet to the second device.

In a 58th aspect, in combination with one or more of the 55th through 57th aspects, the method includes: registering with the central controller using pre-configured security certificates prior to receiving the one or more allocations.

In a 59th aspect, in combination with one or more of the 55th through 58th aspects, the method includes: determining a wireless in-vehicle-network address of the transmission relay based on a wired in-vehicle-network bus to which the transmission relay is connected, wherein determining the wireless in-vehicle-network address of the device comprises mapping the wireless in-vehicle-network address to the wired in-vehicle-network bus.

In a 60th aspect, in combination with one or more of the 55th through 59th aspects, the method includes: receiving, over a third D2D communication link, a configuration for measurement of interference; reporting an interference measurement according to the configuration; and receiving a configuration update for the wirelessly transmitting the data packet, wherein the configuration update is determined based on the interference measurement.

In a 61st aspect, in a wireless communications system, an apparatus includes a memory; and a processor coupled to the memory and configured to: wirelessly transmit a data packet directly via a first device-to-device (D2D) communication link to another device in the vehicle; monitoring for an acknowledgment (ACK) of the data packet; deciding whether to retransmit the data packet to the other device, based on the monitoring; and wirelessly transmitting the data packet to a transmission relay, wherein an intended destination of the data packet is the other device, wherein the monitoring for the ACK comprises monitoring for a first ACK from the other device and a second ACK from the transmission relay.

In a 62nd aspect, in combination with the 61st aspect, the processor is further configured to: wirelessly transmit the data packet directly via the first D2D communication link to the other device by transmitting simultaneously with a transmission relay transmitting the data packet to the other device.

In a 63rd aspect, in combination with the 62nd aspect, the processor is further configured to: receive an allocation of first transmission resources from a central controller in the vehicle, wherein wirelessly transmitting the data packet directly to the other device comprises transmitting the data packet via the first transmission resources; and receive an allocation of second transmission resources from the central controller, wherein wirelessly transmitting the data packet to the transmission relay comprises transmitting the data packet via the second transmission resources In a 64th aspect, in combination with the 63rd aspect, the processor is further configured to: transmit a request for the allocation of first transmission resources and the allocation of second transmission resources to the central controller.

In a 65th aspect, in combination with one or more of the 63rd through 64th aspects, the processor is further configured to: register with the central controller using pre-configured security certificates prior to receiving the allocation of the first transmission resources or the allocation of the second transmission resources.

In a 66th aspect, in combination with one or more of the 63rd through 65th aspects, the processor is further configured to: receive the allocation of the first transmission resources by receiving the allocation of the first transmission resources via a second D2D communication link; and receive the allocation of the second transmission resources by receiving the allocation of the second transmission resources via the second D2D communication link or a third D2D communication link.

In a 67th aspect, in combination with the 66th aspect, the processor is further configured to: discover an address of the central controller based on a broadcast via one of the first, the second, the third, or a fourth D2D communication links.

In a 68$^{th}$ aspect, in combination with one or more of the 61$^{st}$ through 67$^{th}$ aspects, the processor is further configured to: determine a wireless in-vehicle-network address of the device based on a wired in-vehicle-network bus to which the device is connected; and wherein determining the wireless in-vehicle-network address of the device comprises mapping the wireless in-vehicle-network address to the wired in-vehicle-network bus.

In a 69$^{th}$ aspect, in combination with one or more of the 61$^{st}$ through 68$^{th}$ aspects, the processor is further configured to: receive, over the first or a second D2D communication link, a configuration for measurement of interference; and report an interference measurement according to the configuration.

In a 70$^{th}$ aspect, in combination with the 69$^{th}$ aspect, the processor is further configured to: receive a configuration update for wirelessly transmitting the data packet, wherein the configuration update is determined based on reporting the interference measurement.

In a 71$^{st}$ aspect, in a wireless communications system, an apparatus includes a memory; and a processor coupled to the memory and configured to: receive, from a device in the vehicle, a request to transmit from the device to another device in the vehicle; and wirelessly transmit, in response to the request, one or more allocations of transmission resources to the device, wherein the transmission resources comprise first transmission resources for a first transmission from the device directly to the other device, wherein the transmission resources further comprise second transmission resources for a second transmission from the device to a first transmission relay.

In a 72$^{nd}$ aspect, in combination with the 71$^{st}$ aspect, the allocations comprise another allocation of the first transmission resources for a second transmission from the first transmission relay to the other device.

In a 73$^{rd}$ aspect, in combination with one or more of the 71$^{st}$ through 72$^{nd}$ aspects, the processor is further configured to: wirelessly transmitting one or more other allocations of transmission resources to the first transmission relay for the first transmission relay to use for a third transmission to the other device.

In a 74$^{th}$ aspect, in combination with one or more of the 71$^{st}$ through 73$^{rd}$ aspects, the processor is further configured to: wirelessly transmit one or more other allocations of transmission resources to the device for a third transmission to a second transmission relay; and wirelessly transmit one or more other allocations of transmission resources to the second transmission relay for the second transmission relay to use for a fourth transmission to the other device.

In a 75$^{th}$ aspect, in combination with one or more of the 71$^{st}$ through 74$^{th}$ aspects, the processor is further configured to: receive a registration request from the device prior to receiving the request to transmit.

In a 76$^{th}$ aspect, in combination with one or more of the 71$^{st}$ through 75$^{th}$ aspects, the processor is further configured to: determine a wireless in-vehicle-network address of the device based on an address of the device on a wired in-vehicle-network bus to which the device is connected, wherein determining the wireless in-vehicle-network address of the device comprises mapping the wireless in-vehicle-network address to the wired in-vehicle-network bus.

In a 77$^{th}$ aspect, in combination with one or more of the 71$^{st}$ through 76$^{th}$ aspects, the processor is further configured to: wirelessly transmit, in response to the request and via a device-to-device (D2D) communication link, another allocation of the first transmission resources to the other device to receive the first transmission via the first transmission resources; transmit, over a device-to-device (D2D) communication link and to the device, a configuration for measurement of interference; and receive an interference measurement from the device according to the configuration.

In a 78$^{th}$ aspect, in combination with the 77$^{th}$ aspect, the processor is further configured to: transmit, to the device, a configuration update for transmitting from the device to the other device, wherein the configuration update is determined based on the interference measurement.

In a 79$^{th}$ aspect, in a wireless communications system, an apparatus includes a memory; and a processor coupled to the memory and configured to: receive one or more allocations of transmission resources from a central controller in the vehicle; wirelessly receive a data packet from another device other than the central controller via the transmission resources; and wirelessly receive the data packet from a first transmission relay via the transmission resources.

In an 80$^{th}$ aspect, in combination with the 79$^{th}$ aspect, the one or more allocations of transmission resources comprise first transmission resources and second transmission resources; wirelessly receiving the data packet from the other device comprises wirelessly receiving the data packet via the first transmission resources; and wirelessly receiving the data packet from the first transmission relay comprises wirelessly receiving the data packet via the second transmission resources.

In an 81$^{st}$ aspect, in combination with one or more of the 79$^{th}$ through 80$^{th}$ aspects, the processor is further configured to: register with the central controller using pre-configured security certificates prior to receiving the one or more allocations.

In an 82$^{nd}$ aspect, in combination with one or more of the 79$^{th}$ through 81$^{st}$ aspects, the processor is further configured to: determine a wireless in-vehicle-network address of the apparatus based on a wired in-vehicle-network bus to which the apparatus is connected, wherein determining the wireless in-vehicle-network address of the apparatus comprises mapping the wireless in-vehicle-network address to the wired in-vehicle-network bus.

In an 83$^{rd}$ aspect, in combination with one or more of the 79$^{th}$ through 82$^{nd}$ aspects, the processor is further configured to: power-on one or more components of the apparatus in response to receiving the allocations.

In an 84$^{th}$ aspect, in combination with one or more of the 79$^{th}$ through 83$^{rd}$ aspects, wirelessly receiving the data packet from the first transmission relay comprises receiving the data packet from the first transmission relay and the other device simultaneously.

In an 85$^{th}$ aspect, in a wireless communications system, an apparatus includes a memory; and a processor coupled to the memory and configured to: receive one or more allocations of transmission resources from a central controller in the vehicle; wirelessly receive a data packet from a first device via a first device-to-device (D2D) communication link on the transmission resources; and wirelessly transmit the data packet to a second device via a second D2D communication link on the transmission resources.

In an 86$^{th}$ aspect, in combination with the 85$^{th}$ aspect, the one or more allocations of transmission resources comprise first transmission resources and second transmission resources; wirelessly receiving the data packet from the first device comprises wirelessly receiving the data packet via the first D2D communication link on the first transmission resources; and wirelessly transmitting the data packet to the second device comprises wirelessly transmitting the data packet via the second D2D communication link on the second transmission resources.

In an 87$^{th}$ aspect, in combination with one or more of the 85$^{th}$ through 86$^{th}$ aspects, wirelessly transmitting the data packet to the second device comprises transmitting simultaneously with the first device transmitting the data packet to the second device.

In an 88$^{th}$ aspect, in combination with one or more of the 85$^{th}$ through 87$^{th}$ aspects, the processor is further configured to: register with the central controller using pre-configured security certificates prior to receiving the one or more allocations.

In an 89$^{th}$ aspect, in combination with one or more of the 85$^{th}$ through 88$^{th}$ aspects, the processor is further configured to: determine a wireless in-vehicle-network address of the apparatus based on a wired in-vehicle-network bus to which the apparatus is connected, wherein determining the wireless in-vehicle-network address of the apparatus comprises mapping the wireless in-vehicle-network address to the wired in-vehicle-network bus.

In a 90$^{th}$ aspect, in combination with one or more of the 85$^{th}$ through 89$^{th}$ aspects, the processor is further configured to: receive, over a third D2D communication link, a configuration for measurement of interference; report an interference measurement according to the configuration; and receiving a configuration update for the wirelessly transmitting the data packet, wherein the configuration update is determined based on the interference measurement.

In a 91$^{st}$ aspect, in a wireless communications system, an apparatus in a vehicle includes a memory; and a processor coupled to the memory and configured to: wirelessly transmit a data packet directly via a first device-to-device (D2D) communication link to another device in the vehicle; monitor for an acknowledgment (ACK) of the data packet; deciding whether to retransmit the data packet to the other device, based on whether the ACK was monitored; and wirelessly transmit the data packet to a transmission relay, wherein an intended destination of the data packet is the other device, wherein monitoring for the ACK comprises monitoring for a first ACK from the other device and a second ACK from the transmission relay.

In a 92$^{nd}$ aspect, in combination with the 91$^{st}$ aspect, wirelessly transmitting the data packet directly via the first D2D communication link to the other device comprises transmitting simultaneously with a transmission relay transmitting the data packet to the other device.

In a 93$^{rd}$ aspect, in combination with one or more of the 91$^{st}$ through 92$^{nd}$ aspects, the processor is further configured to: receive an allocation of first transmission resources from a central controller in the vehicle, wherein wirelessly transmitting the data packet directly to the other device comprises transmitting the data packet via the first transmission resources; and receive an allocation of second transmission resources from the central controller, wherein wirelessly transmitting the data packet to the transmission relay comprises transmitting the data packet via the second transmission resources.

In a 94$^{th}$ aspect, in combination with one or more of the 91$^{st}$ through 93$^{rd}$ aspects, the processor is further configured to: transmit a request for the allocation of first transmission resources and the allocation of second transmission resources to the central controller.

In a 95$^{th}$ aspect, in combination with one or more of the 91$^{st}$ through 94$^{th}$ aspects, the processor is further configured to: register with the central controller using pre-configured security certificates prior to receiving the allocation of the first transmission resources or the allocation of the second transmission resources.

In a 96$^{th}$ aspect, in combination with one or more of the 91$^{st}$ through 95$^{th}$ aspects, receiving the allocation of the first transmission resources comprises receiving the allocation of the first transmission resources via a second D2D communication link; and receiving the allocation of the second transmission resources comprises receiving the allocation of the second transmission resources via the second D2D communication link or a third D2D communication link.

In a 97$^{th}$ aspect, in combination with one or more of the 91$^{st}$ through 96$^{th}$ aspects, the processor is further configured to: discover an address of the central controller based on a broadcast via one of the first, the second, the third, or a fourth D2D communication links.

In a 98$^{th}$ aspect, in combination with one or more of the 91$^{st}$ through 97$^{th}$ aspects, the processor is further configured to: determine a wireless in-vehicle-network address of the apparatus based on a wired in-vehicle-network bus to which the apparatus is connected, wherein determining the wireless in-vehicle-network address of the apparatus comprises mapping the wireless in-vehicle-network address to the wired in-vehicle-network bus.

In a 99$^{th}$ aspect, in combination with one or more of the 91$^{st}$ through 98$^{th}$ aspects, the processor is further configured to: receive, over the first or a second D2D communication link, a configuration for measurement of interference; and report an interference measurement according to the configuration.

In a 100$^{th}$ aspect, in combination with one or more of the 91$^{st}$ through 99$^{th}$ aspects, the processor is further configured to: receive a configuration update for the wirelessly transmitting the data packet, wherein the configuration update is determined based on the reporting the interference measurement.

In a 101$^{st}$ aspect, in a wireless communications system, an apparatus in a vehicle includes a memory; and a processor coupled to the memory and configured to: receive, from a device in the vehicle, a request to transmit from the device to another device in the vehicle; and wirelessly transmit, in response to the request, one or more allocations of transmission resources to the device, wherein the transmission resources comprise first transmission resources for a first transmission from the device directly to the other device, wherein the transmission resources further comprise second transmission resources for a second transmission from the device to a first transmission relay.

In a 102$^{nd}$ aspect, in combination with the 101$^{st}$ aspect, the allocations comprise another allocation of the first transmission resources for a second transmission from the first transmission relay to the other device.

In a 103$^{rd}$ aspect, in combination with one or more of the 101$^{st}$ through 102$^{nd}$ aspects, the processor is further configured to: wirelessly transmit one or more other allocations of transmission resources to the first transmission relay for the first transmission relay to use for a third transmission to the other device.

In a 104$^{th}$ aspect, in combination with one or more of the 101$^{st}$ through 103$^{rd}$ aspects, the processor is further configured to: wirelessly transmit one or more other allocations of transmission resources to the device for a third transmission to a second transmission relay; and wirelessly transmit one or more other allocations of transmission resources to the second transmission relay for the second transmission relay to use for a fourth transmission to the other device.

In a 105th aspect, in combination with one or more of the 101st through 104th aspects, the processor is further configured to: receive a registration request from the device prior to receiving the request to transmit.

In a 106th aspect, in combination with one or more of the 101st through 105th aspects, the processor is further configured to: determine a wireless in-vehicle-network address of the device based on an address of the device on a wired in-vehicle-network bus to which the device is connected, wherein determining the wireless in-vehicle-network address of the device comprises mapping the wireless in-vehicle-network address to the wired in-vehicle-network bus.

In a 107th aspect, in combination with one or more of the 101st through 106th aspects, the processor is further configured to: wirelessly transmit, in response to the request and via a device-to-device (D2D) communication link, another allocation of the first transmission resources to the other device to receive the first transmission via the first transmission resources; transmit, over a device-to-device (D2D) communication link and to the device, a configuration for measurement of interference; and receive an interference measurement from the device according to the configuration.

In a 108th aspect, in combination with one or more of the 101st through 107th aspects, the processor is further configured to: transmit, to the device, a configuration update for transmitting from the device to the other device, wherein the configuration update is determined based on the interference measurement.

In a 109th aspect, in a wireless communications system, an apparatus in a vehicle includes a memory; and a processor coupled to the memory and configured to: receive one or more allocations of transmission resources from a central controller in the vehicle; wirelessly receive a data packet from another device other than the central controller via the transmission resources; and wirelessly receive the data packet from a first transmission relay via the transmission resources.

In a 110th aspect, in combination with the 109th aspect, the one or more allocations of transmission resources comprise first transmission resources and second transmission resources; wirelessly receiving the data packet from the other device comprises wirelessly receiving the data packet via the first transmission resources; and wirelessly receiving the data packet from the first transmission relay comprises wirelessly receiving the data packet via the second transmission resources.

In a 111th aspect, in combination with one or more of the 109th through 110th aspects, the processor is further configured to: register with the central controller using pre-configured security certificates prior to receiving the one or more allocations.

In a 112th aspect, in combination with one or more of the 109th through 111th aspects, the processor is further configured to: determine a wireless in-vehicle-network address of the device based on a wired in-vehicle-network bus to which the device is connected, wherein determining the wireless in-vehicle-network address of the device comprises mapping the wireless in-vehicle-network address to the wired in-vehicle-network bus.

In a 113th aspect, in combination with one or more of the 109th through 112th aspects, the processor is further configured to: power-on one or more components of the apparatus in response to receiving the allocations.

In a 114th aspect, in combination with one or more of the 109th through 113th aspects, wirelessly receiving the data packet from the first transmission relay comprises receiving the data packet from the first transmission relay and the other device simultaneously.

In a 115th aspect, in a wireless communications system, an apparatus in a vehicle includes a memory; and a processor coupled to the memory and configured to: receive one or more allocations of transmission resources from a central controller in the vehicle; wirelessly receive a data packet from a first device via a first device-to-device (D2D) communication link on the transmission resources; and wirelessly transmit the data packet to a second device via a second D2D communication link on the transmission resources.

In a 116th aspect, in combination with the 115th aspect, the one or more allocations of transmission resources comprise first transmission resources and second transmission resources; wirelessly receiving the data packet from the first device comprises wirelessly receiving the data packet via the first D2D communication link on the first transmission resources; and wirelessly transmitting the data packet to the second device comprises wirelessly transmitting the data packet via the second D2D communication link on the second transmission resources.

In a 117th aspect, in combination with one or more of the 115th through 116th aspects, wirelessly transmitting the data packet to the second device comprises transmitting simultaneously with the first device transmitting the data packet to the second device.

In a 118th aspect, in combination with one or more of the 115th through 117th aspects, the processor is further configured to: register with the central controller using pre-configured security certificates prior to receiving the one or more allocations.

In a 119th aspect, in combination with one or more of the 115th through 118th aspects, the processor is further configured to: determine a wireless in-vehicle-network address of the apparatus based on a wired in-vehicle-network bus to which the transmission relay is connected, wherein determining the wireless in-vehicle-network address of the device comprises mapping the wireless in-vehicle-network address to the wired in-vehicle-network bus.

In a 120th aspect, in combination with one or more of the 115th through 119th aspects, the processor is further configured to: receive, over a third D2D communication link, a configuration for measurement of interference; report an interference measurement according to the configuration; and receive a configuration update for the wirelessly transmitting the data packet, wherein the configuration update is determined based on the interference measurement.

In a 121st aspect, an apparatus for wireless communication includes: means for wirelessly transmitting a data packet directly via a first device-to-device (D2D) communication link to another device in the vehicle; means for monitoring for an acknowledgment (ACK) of the data packet; means for deciding whether to retransmit the data packet to the other device, based on the monitoring; and means for wirelessly transmitting the data packet to a transmission relay, wherein an intended destination of the data packet is the other device, wherein the monitoring for the ACK comprises monitoring for a first ACK from the other device and a second ACK from the transmission relay.

In a 122nd aspect, in combination with the 121st aspect, wirelessly transmitting the data packet directly via the first D2D communication link to the other device comprises transmitting simultaneously with a transmission relay transmitting the data packet to the other device.

In a 123$^{rd}$ aspect, in combination with one or more of the 121$^{st}$ through 122$^{nd}$ aspects, the apparatus includes: means for receiving an allocation of first transmission resources from a central controller in the vehicle, wherein wirelessly transmitting the data packet directly to the other device comprises transmitting the data packet via the first transmission resources; and receiving an allocation of second transmission resources from the central controller, wherein wirelessly transmitting the data packet to the transmission relay comprises transmitting the data packet via the second transmission resources.

In a 124$^{th}$ aspect, in combination with the 123$^{rd}$ aspect, the apparatus includes: means for transmitting a request for the allocation of first transmission resources and the allocation of second transmission resources to the central controller.

In a 125$^{th}$ aspect, in combination with one or more of the 123$^{rd}$ through 124$^{th}$ aspects, the apparatus includes: means for registering with the central controller using pre-configured security certificates prior to receiving the allocation of the first transmission resources or the allocation of the second transmission resources.

In a 126$^{th}$ aspect, in combination with one or more of the 123$^{rd}$ through 125$^{th}$ aspects, the means for receiving the allocation of the first transmission resources includes means for receiving the allocation of the first transmission resources via a second D2D communication link; and the means for receiving the allocation of the second transmission resources includes means for receiving the allocation of the second transmission resources via the second D2D communication link or a third D2D communication link.

In a 127$^{th}$ aspect, in combination with the 126$^{th}$ aspect, the apparatus includes: means for discovering an address of the central controller based on a broadcast via one of the first, the second, the third, or a fourth D2D communication links.

In a 128$^{th}$ aspect, in combination with one or more of the 121$^{st}$ through 127$^{th}$ aspects, the apparatus includes: means for determining a wireless in-vehicle-network address of the apparatus based on a wired in-vehicle-network bus to which the apparatus is connected, wherein determining the wireless in-vehicle-network address of the apparatus comprises mapping the wireless in-vehicle-network address to the wired in-vehicle-network bus.

In a 129$^{th}$ aspect, in combination with one more of the 121$^{st}$ through 128$^{th}$ aspects, the apparatus includes: means for receiving, over the first or a second D2D communication link, a configuration for measurement of interference; and means for reporting an interference measurement according to the configuration.

In a 130$^{th}$ aspect, in combination with the 129$^{th}$ aspect, the apparatus includes: means for receiving a configuration update for the wirelessly transmitting the data packet, wherein the configuration update is determined based on the reporting the interference measurement.

In a 131$^{st}$ aspect, an apparatus for wireless communications in a vehicle includes: means for receiving, from a device in the vehicle, a request to transmit from the device to another device in the vehicle; and means for wirelessly transmitting, in response to the request, one or more allocations of transmission resources to the device, wherein the transmission resources comprise first transmission resources for a first transmission from the device directly to the other device, wherein the transmission resources further comprise second transmission resources for a second transmission from the device to a first transmission relay.

In a 132$^{nd}$ aspect, in combination with the 131$^{st}$ aspect, the allocations comprise another allocation of the first transmission resources for a second transmission from the first transmission relay to the other device.

In a 133$^{rd}$ aspect, in combination with one or more of the 131$^{st}$ through 132$^{nd}$ aspects, the apparatus includes: means for wirelessly transmitting one or more other allocations of transmission resources to the first transmission relay for the first transmission relay to use for a third transmission to the other device.

In a 134$^{th}$ aspect, in combination with one or more of the 131$^{st}$ through 133$^{rd}$ aspects, the apparatus includes: means for wirelessly transmitting one or more other allocations of transmission resources to the device for a third transmission to a second transmission relay; and wirelessly transmitting one or more other allocations of transmission resources to the second transmission relay for the second transmission relay to use for a fourth transmission to the other device.

In a 135$^{th}$ aspect, in combination with one or more of the 131$^{st}$ through 134$^{th}$ aspects, the apparatus includes: means for receiving a registration request from the device prior to receiving the request to transmit.

In a 136$^{th}$ aspect, in combination with one or more of the 131$^{st}$ through 135$^{th}$ aspects, the apparatus includes: means for determining a wireless in-vehicle-network address of the device based on an address of the device on a wired in-vehicle-network bus to which the device is connected, wherein determining the wireless in-vehicle-network address of the device comprises mapping the wireless in-vehicle-network address to the wired in-vehicle-network bus.

In a 137$^{th}$ aspect, in combination with one or more of the 131$^{st}$ through 136$^{th}$ aspects, the apparatus includes: means for wirelessly transmitting, in response to the request and via a device-to-device (D2D) communication link, another allocation of the first transmission resources to the other device to receive the first transmission via the first transmission resources; means for transmitting, over a device-to-device (D2D) communication link and to the device, a configuration for measurement of interference; and means for receiving an interference measurement from the device according to the configuration.

In a 138$^{th}$ aspect, in combination with the 137$^{th}$ aspect, the apparatus includes: means for transmitting, to the device, a configuration update for transmitting from the device to the other device, wherein the configuration update is determined based on the interference measurement.

In a 139$^{th}$ aspect, an apparatus for wireless communications in a vehicle, includes: means for receiving one or more allocations of transmission resources from a central controller in the vehicle; means for wirelessly receiving a data packet from another device other than the central controller via the transmission resources; and means for wirelessly receiving the data packet from a first transmission relay via the transmission resources.

In a 140$^{th}$ aspect, in combination with the 139$^{th}$ aspect, the one or more allocations of transmission resources comprise first transmission resources and second transmission resources; the means for wirelessly receiving the data packet from the other device comprises means for wirelessly receiving the data packet via the first transmission resources; and the means for wirelessly receiving the data packet from the first transmission relay comprises wirelessly receiving the data packet via the second transmission resources.

In a 141$^{st}$ aspect, in combination with one or more of the 139$^{th}$ through 140$^{th}$ aspects, the apparatus includes: means for registering with the central controller using pre-configured security certificates prior to receiving the one or more allocations.

In a 142$^{nd}$ aspect, in combination with one or more of the 139$^{th}$ through 141$^{st}$ aspects, the apparatus includes: means for determining a wireless in-vehicle-network address of the device based on a wired in-vehicle-network bus to which the device is connected, wherein the means for determining the wireless in-vehicle-network address of the device comprises means for mapping the wireless in-vehicle-network address to the wired in-vehicle-network bus.

In a 143$^{rd}$ aspect, in combination with one or more of the 139$^{th}$ through 142$^{nd}$ aspects, the apparatus includes: means for powering-on one or more components of the apparatus in response to receiving the allocations.

In a 144$^{th}$ aspect, in combination with one or more of the 139$^{th}$ through 143$^{rd}$ aspects, wirelessly receiving the data packet from the first transmission relay comprises receiving the data packet from the first transmission relay and the other device simultaneously.

In a 145$^{th}$ aspect, an apparatus for wireless communications in a vehicle, includes: means for receiving one or more allocations of transmission resources from a central controller in the vehicle; means for wirelessly receiving a data packet from a first device via a first device-to-device (D2D) communication link on the transmission resources; and means for wirelessly transmitting the data packet to a second device via a second D2D communication link on the transmission resources.

In a 146$^{th}$ aspect, in combination with the 145$^{th}$ aspect, the one or more allocations of transmission resources comprise first transmission resources and second transmission resources; the means for wirelessly receiving the data packet from the first device comprises means for wirelessly receiving the data packet via the first D2D communication link on the first transmission resources; and the means for wirelessly transmitting the data packet to the second device comprises means for wirelessly transmitting the data packet via the second D2D communication link on the second transmission resources.

In a 147$^{th}$ aspect, in combination with one or more of the 145$^{th}$ through 146$^{th}$ aspects, the means for wirelessly transmitting the data packet to the second device comprises means for transmitting simultaneously with the first device transmitting the data packet to the second device.

In a 148$^{th}$ aspect, in combination with one or more of the 145$^{th}$ through 147$^{th}$ aspects, the apparatus includes: means for registering with the central controller using pre-configured security certificates prior to receiving the one or more allocations.

In a 149$^{th}$ aspect, in combination with one or more of the 145$^{th}$ through 148$^{th}$ aspects, the apparatus includes: means for determining a wireless in-vehicle-network address of the apparatus based on a wired in-vehicle-network bus to which the apparatus is connected, wherein the means for determining the wireless in-vehicle-network address of the device comprises means for mapping the wireless in-vehicle-network address to the wired in-vehicle-network bus.

In a 150$^{th}$ aspect, in combination with one or more of the 145$^{th}$ through 149$^{th}$ aspects, the apparatus includes: means for receiving, over a third D2D communication link, a configuration for measurement of interference; means for reporting an interference measurement according to the configuration; and means for receiving a configuration update for the wirelessly transmitting the data packet, wherein the configuration update is determined based on the interference measurement.

In a 151$^{st}$ aspect, an apparatus for communications in a vehicle, comprising: means for wirelessly transmitting a data packet directly via a first device-to-device (D2D) communication link to another device in the vehicle; means for monitoring for an acknowledgment (ACK) of the data packet; means for deciding whether to retransmit the data packet to the other device, based on the monitoring; and means for wirelessly transmitting the data packet to a transmission relay, wherein an intended destination of the data packet is the other device, wherein the means for monitoring for the ACK comprises means for monitoring for a first ACK from the other device and a second ACK from the transmission relay.

In a 152$^{nd}$ aspect, in combination with the 151$^{st}$ aspect, the means for wirelessly transmitting the data packet directly via the first D2D communication link to the other device comprises means for transmitting simultaneously with a transmission relay transmitting the data packet to the other device.

In a 153$^{rd}$ aspect, in combination with one or more of the 151$^{st}$ through 152$^{nd}$ aspects, the apparatus includes: means for receiving an allocation of first transmission resources from a central controller in the vehicle, wherein the means for wirelessly transmitting the data packet directly to the other device comprises means for transmitting the data packet via the first transmission resources; and means for receiving an allocation of second transmission resources from the central controller, wherein the means for wirelessly transmitting the data packet to the transmission relay comprises means for transmitting the data packet via the second transmission resources.

In a 154$^{th}$ aspect, in combination with one or more of the 151$^{st}$ through 153$^{rd}$ aspects, the apparatus includes: means for transmitting a request for the allocation of first transmission resources and the allocation of second transmission resources to the central controller.

In a 155$^{th}$ aspect, in combination with one or more of the 151$^{st}$ through 154$^{th}$ aspects, the apparatus includes: means for registering with the central controller using pre-configured security certificates prior to receiving the allocation of the first transmission resources or the allocation of the second transmission resources.

In a 156$^{th}$ aspect, in combination with one or more of the 151$^{st}$ through 155$^{th}$ aspects, the means for receiving the allocation of the first transmission resources comprises means for receiving the allocation of the first transmission resources via a second D2D communication link; and the means for receiving the allocation of the second transmission resources comprises means for receiving the allocation of the second transmission resources via the second D2D communication link or a third D2D communication link.

In a 157$^{th}$ aspect, in combination with one or more of the 151$^{st}$ through 156$^{th}$ aspects, the apparatus includes: means for discovering an address of the central controller based on a broadcast via one of the first, the second, the third, or a fourth D2D communication links.

In a 158$^{th}$ aspect, in combination with one or more of the 151$^{st}$ through 157$^{th}$ aspects, the apparatus includes: means for determining a wireless in-vehicle-network address of the apparatus based on a wired in-vehicle-network bus to which the apparatus is connected, wherein the means for determining the wireless in-vehicle-network address of the apparatus comprises means for mapping the wireless in-vehicle-network address to the wired in-vehicle-network bus.

In a 159$^{th}$ aspect, in combination with one or more of the 151$^{st}$ through 158$^{th}$ aspects, the apparatus includes: means for receiving, over the first or a second D2D communication link, a configuration for measurement of interference; and means for reporting an interference measurement according to the configuration.

In a 160th aspect, in combination with one or more of the 151st through 159th aspects, the apparatus includes: means for receiving a configuration update for the wirelessly transmitting the data packet, wherein the configuration update is determined based on the interference measurement.

In a 161st aspect, an apparatus for wireless communications in a vehicle includes: means for receiving, from a device in the vehicle, a request to transmit from the device to another device in the vehicle; and means for wirelessly transmitting, in response to the request, one or more allocations of transmission resources to the device, wherein the transmission resources comprise first transmission resources for a first transmission from the device directly to the other device, wherein the transmission resources further comprise second transmission resources for a second transmission from the device to a first transmission relay.

In a 162nd aspect, in combination with the 161st aspect, the allocations comprise another allocation of the first transmission resources for a second transmission from the first transmission relay to the other device.

In a 163rd aspect, in combination with one or more of the 161st through 162nd aspects, the apparatus includes: means for wirelessly transmitting one or more other allocations of transmission resources to the first transmission relay for the first transmission relay to use for a third transmission to the other device.

In a 164th aspect, in combination with one or more of the 161st through 163rd aspects, the apparatus includes: means for wirelessly transmitting one or more other allocations of transmission resources to the device for a third transmission to a second transmission relay; and means for wirelessly transmitting one or more other allocations of transmission resources to the second transmission relay for the second transmission relay to use for a fourth transmission to the other device.

In a 165th aspect, in combination with one or more of the 161st through 164th aspects, the apparatus includes: means for receiving a registration request from the device prior to receiving the request to transmit.

In a 166th aspect, in combination with one or more of the 161st through 165th aspects, the apparatus includes: means for determining a wireless in-vehicle-network address of the device based on an address of the device on a wired in-vehicle-network bus to which the device is connected, wherein the means for determining the wireless in-vehicle-network address of the device comprises means for mapping the wireless in-vehicle-network address to the wired in-vehicle-network bus.

In a 167th aspect, in combination with one or more of the 161st through 166th aspects, the apparatus includes: means for wirelessly transmitting, in response to the request and via a device-to-device (D2D) communication link, another allocation of the first transmission resources to the other device to receive the first transmission via the first transmission resources; means for transmitting, over a device-to-device (D2D) communication link and to the device, a configuration for measurement of interference; and means for receiving an interference measurement from the device according to the configuration.

In a 168th aspect, in combination with one or more of the 161st through 167th aspects, the apparatus includes: means for transmitting, to the device, a configuration update for transmitting from the device to the other device, wherein the configuration update is determined based on the interference measurement.

In a 169th aspect, an apparatus for wireless communications in a vehicle includes: means for receiving one or more allocations of transmission resources from a central controller in the vehicle; means for wirelessly receiving a data packet from another device other than the central controller via the transmission resources; and means for wirelessly receiving the data packet from a first transmission relay via the transmission resources.

In a 170th aspect, in combination with the 171st aspect, the one or more allocations of transmission resources comprise first transmission resources and second transmission resources; the means for wirelessly receiving the data packet from the other device comprises means for wirelessly receiving the data packet via the first transmission resources; and the means for wirelessly receiving the data packet from the first transmission relay comprises means for wirelessly receiving the data packet via the second transmission resources.

In a 171st aspect, in combination with one or more of the 169th through 170th aspects, the apparatus includes: means for registering with the central controller using pre-configured security certificates prior to receiving the one or more allocations.

In a 172nd aspect, in combination with one or more of the 169th through 171st aspects, the apparatus includes: means for determining a wireless in-vehicle-network address of the apparatus based on a wired in-vehicle-network bus to which the apparatus is connected, wherein the means for determining the wireless in-vehicle-network address of the apparatus comprises means for mapping the wireless in-vehicle-network address to the wired in-vehicle-network bus.

In a 173rd aspect, in combination with one or more of the 169th through 172nd aspects, the apparatus includes: means for powering-on one or more components of the apparatus in response to receiving the allocations.

In a 174th aspect, in combination with one or more of the 169th through 173rd aspects, the means for wirelessly receiving the data packet from the first transmission relay comprises means for receiving the data packet from the first transmission relay and the other device simultaneously.

In a 175th aspect, an apparatus for wireless communications in a vehicle includes: means for receiving one or more allocations of transmission resources from a central controller in the vehicle; means for wirelessly receiving a data packet from a first device via a first device-to-device (D2D) communication link on the transmission resources; and means for wirelessly transmitting the data packet to a second device via a second D2D communication link on the transmission resources.

In a 176th aspect, in combination with the 175th aspect, the one or more allocations of transmission resources comprise first transmission resources and second transmission resources; the means for wirelessly receiving the data packet from the first device comprises means for wirelessly receiving the data packet via the first D2D communication link on the first transmission resources; and the means for wirelessly transmitting the data packet to the second device comprises means for wirelessly transmitting the data packet via the second D2D communication link on the second transmission resources.

In a 177th aspect, in combination with one or more of the 175th through 176th aspects, the means for wirelessly transmitting the data packet to the second device comprises means for transmitting simultaneously with the first device transmitting the data packet to the second device.

In a 178th aspect, in combination with one or more of the 175th through 177th aspects, the apparatus includes: means for registering with the central controller using pre-configured security certificates prior to receiving the one or more allocations.

In a 179<sup>th</sup> aspect, in combination with one or more of the 175<sup>th</sup> through 178<sup>th</sup> aspects, the apparatus includes: means for determining a wireless in-vehicle-network address of the transmission relay based on a wired in-vehicle-network bus to which the transmission relay is connected, wherein the means for determining the wireless in-vehicle-network address of the device comprises means for mapping the wireless in-vehicle-network address to the wired in-vehicle-network bus.

In a 180<sup>th</sup> aspect, in combination with one or more of the 175<sup>th</sup> through 179<sup>th</sup> aspects, the apparatus includes: means for receiving, over a third D2D communication link, a configuration for measurement of interference; means for reporting an interference measurement according to the configuration; and means for receiving a configuration update for the wirelessly transmitting the data packet, wherein the configuration update is determined based on the interference measurement.

What is claimed is:

1. A method for communications performed by a device in a vehicle, comprising:
   receiving an allocation of first transmission resources from a central controller in the vehicle;
   wirelessly transmitting a data packet directly via a first device-to-device (D2D) communication link to another device in the vehicle via the first transmission resources;
   monitoring for an acknowledgment (ACK) of the data packet;
   deciding whether to retransmit the data packet to the other device, based on the monitoring;
   receiving an allocation of second transmission resources from the central controller; and
   wirelessly transmitting the data packet to a transmission relay via the second transmission resources, wherein an intended destination of the data packet is the other device, wherein the monitoring for the ACK comprises monitoring for a first ACK from the other device and a second ACK from the transmission relay.

2. The method of claim 1, wherein wirelessly transmitting the data packet directly via the first D2D communication link to the other device comprises transmitting simultaneously with the transmission relay transmitting the data packet to the other device.

3. The method of claim 1, further comprising:
   transmitting a request for the allocation of the first transmission resources and the allocation of the second transmission resources to the central controller.

4. The method of claim 1, further comprising:
   registering with the central controller using pre-configured security certificates prior to receiving the allocation of the first transmission resources or the allocation of the second transmission resources.

5. The method of claim 1, wherein:
   receiving the allocation of the first transmission resources comprises receiving the allocation of the first transmission resources via a second D2D communication link; and
   receiving the allocation of the second transmission resources comprises receiving the allocation of the second transmission resources via the second D2D communication link or a third D2D communication link.

6. The method of claim 5, further comprising:
   discovering an address of the central controller based on a broadcast via one of the first, the second, the third, or a fourth D2D communication links.

7. The method of claim 1, further comprising:
   determining a wireless in-vehicle-network address of the device based on a wired in-vehicle-network bus to which the device is connected, wherein determining the wireless in-vehicle-network address of the device comprises mapping the wireless in-vehicle-network address to the wired in-vehicle-network bus.

8. The method of claim 1, further comprising:
   receiving, over the first or a second D2D communication link, a configuration for measurement of interference; and
   reporting the interference measurement according to the configuration.

9. The method of claim 8, further comprising:
   receiving a configuration update for the wirelessly transmitting the data packet, wherein the configuration update is determined based on the reporting the interference measurement.

10. An apparatus for wireless communications performed by a device in a vehicle, comprising:
    a memory comprising computer-executable instructions; and
    one or more processors configured to execute the computer-executable instructions and cause the apparatus to:
      receive an allocation of first transmission resources from a central controller in the vehicle;
      wirelessly transmit a data packet directly via a first device-to-device (D2D) communication link to another device in the vehicle via the first transmission resources;
      monitor for an acknowledgment (ACK) of the data packet;
      deciding whether to retransmit the data packet to the other device, based on the monitoring;
      receive an allocation of second transmission resources from the central controller; and
      wirelessly transmit the data packet to a transmission relay via the second transmission resources, wherein an intended destination of the data packet is the other device, wherein the monitoring for the ACK comprises monitoring for a first ACK from the other device and a second ACK from the transmission relay.

11. The apparatus of claim 10, wherein the memory and the one or more processors are configured to cause the apparatus to wirelessly transmit the data packet directly via the first D2D communication link to the other device by transmitting simultaneously with the transmission relay transmitting the data packet to the other device.

12. The apparatus of claim 10, wherein the memory and the one or more processors are further configured to cause the apparatus to:
    transmit a request for the allocation of the first transmission resources and the allocation of the second transmission resources to the central controller.

13. The apparatus of claim 10, wherein the memory and the one or more processors are further configured to cause the apparatus to:
    register with the central controller using pre-configured security certificates prior to receiving the allocation of the first transmission resources or the allocation of the second transmission resources.

14. The apparatus of claim 10, wherein the memory and the one or more processors are configured to cause the apparatus:
receive the allocation of the first transmission resources by receiving the allocation of the first transmission resources via a second D2D communication link; and
receive the allocation of the second transmission resources by receiving the allocation of the second transmission resources via the second D2D communication link or a third D2D communication link.

15. The apparatus of claim 14, wherein the memory and the one or more processors are further configured to cause the apparatus to:
discover an address of the central controller based on a broadcast via one of the first, the second, the third, or a fourth D2D communication links.

16. The apparatus of claim 10, wherein the memory and the one or more processors are further configured to cause the apparatus to:
determine a wireless in-vehicle-network address of the device based on a wired in-vehicle-network bus to which the device is connected by mapping the wireless in-vehicle-network address to the wired in-vehicle-network bus.

17. The apparatus of claim 10, wherein the memory and the one or more processors are further configured to cause the apparatus to:
receive, over the first or a second D2D communication link, a configuration for measurement of interference; and
report the interference measurement according to the configuration.

18. The apparatus of claim 17, wherein the memory and the one or more processors are further configured to cause the apparatus to:
receive a configuration update for the wirelessly transmitting the data packet, wherein the configuration update is determined based on the reporting the interference measurement.

19. A non-transitory computer readable medium having instructions stored thereon which when executed by one or more processors in a device in a vehicle, causes an apparatus to perform a method, the method comprising:
receiving an allocation of first transmission resources from a central controller in the vehicle;
wirelessly transmitting a data packet directly via a first device-to-device (D2D) communication link to another device in the vehicle via the first transmission resources;
monitoring for an acknowledgment (ACK) of the data packet;
deciding whether to retransmit the data packet to the other device, based on the monitoring;
receive an allocation of second transmission resources from the central controller; and
wirelessly transmitting the data packet to a transmission relay via the second transmission resources, wherein an intended destination of the data packet is the other device, wherein the monitoring for the ACK comprises monitoring for a first ACK from the other device and a second ACK from the transmission relay.

20. The non-transitory computer readable medium of claim 19, wherein wirelessly transmitting the data packet directly via the first D2D communication link to the other device comprises transmitting simultaneously with the transmission relay transmitting the data packet to the other device.

21. The non-transitory computer readable medium of claim 19, wherein the method further comprises:
transmitting a request for the allocation of the first transmission resources and the allocation of the second transmission resources to the central controller.

22. The non-transitory computer readable medium of claim 19, wherein the method further comprises:
registering with the central controller using pre-configured security certificates prior to receiving the allocation of the first transmission resources or the allocation of the second transmission resources.

23. The non-transitory computer readable medium of claim 19, wherein:
receiving the allocation of the first transmission resources comprises receiving the allocation of the first transmission resources via a second D2D communication link; and
receiving the allocation of the second transmission resources comprises receiving the allocation of the second transmission resources via the second D2D communication link or a third D2D communication link.

24. The non-transitory computer readable medium of claim 23, wherein the method further comprises:
discovering an address of the central controller based on a broadcast via one of the first, the second, the third, or a fourth D2D communication links.

25. The non-transitory computer readable medium of claim 19, wherein the method further comprises:
determining a wireless in-vehicle-network address of the device based on a wired in-vehicle-network bus to which the device is connected, wherein determining the wireless in-vehicle-network address of the device comprises mapping the wireless in-vehicle-network address to the wired in-vehicle-network bus.

26. The non-transitory computer readable medium of claim 19, wherein the method further comprises:
receiving, over the first or a second D2D communication link, a configuration for measurement of interference; and
reporting the interference measurement according to the configuration.

27. The non-transitory computer readable medium of claim 26, wherein the method further comprises:
receiving a configuration update for the wirelessly transmitting the data packet, wherein the configuration update is determined based on the reporting the interference measurement.

28. An apparatus for wireless communications performed by a device in a vehicle, comprising:
means for receiving an allocation of first transmission resources from a central controller in the vehicle;
means for wirelessly transmitting a data packet directly via a first device-to-device (D2D) communication link to another device in the vehicle via the first transmission resources;
means for monitoring for an acknowledgment (ACK) of the data packet;
means for deciding whether to retransmit the data packet to the other device, based on the monitoring;
means for receiving an allocation of second transmission resources from the central controller; and
means for wirelessly transmitting the data packet to a transmission relay via the second transmission resources, wherein an intended destination of the data packet is the other device, wherein the monitoring for the ACK comprises monitoring for a first ACK from the other device and a second ACK from the transmission relay.

29. The apparatus of claim 28, wherein wirelessly transmitting the data packet directly via the first D2D communication link to the other device comprises transmitting simultaneously with the transmission relay transmitting the data packet to the other device.

30. The apparatus of claim 28, further comprising:
means for transmitting a request for the allocation of the first transmission resources and the allocation of the second transmission resources to the central controller.

* * * * *